US009958041B2

(12) United States Patent
Sanders et al.

(10) Patent No.: US 9,958,041 B2
(45) Date of Patent: May 1, 2018

(54) POWER DELIVERY DEVICES FOR RECIPROCATING ENGINES AND RELATED SYSTEMS AND METHODS

(71) Applicant: Enfield Engine Company, LLC, Enfield, NH (US)

(72) Inventors: Nicholas A. Sanders, Enfield, NH (US); Ryan Thomas Kiley Sanders, Enfield, NH (US)

(73) Assignee: Enfield Engine Company, LLC, Enfield, NH (US)

( * ) Notice: Subject to any disclaimer, the term of this patent is extended or adjusted under 35 U.S.C. 154(b) by 0 days. days.

(21) Appl. No.: 15/231,322

(22) Filed: Aug. 8, 2016

(65) Prior Publication Data

US 2016/0363198 A1 Dec. 15, 2016

Related U.S. Application Data

(63) Continuation-in-part of application No. 14/294,977, filed on Jun. 3, 2014, now Pat. No. 9,410,477.
(Continued)

(51) Int. Cl.
*F02B 75/32* (2006.01)
*F16H 19/02* (2006.01)
(Continued)

(52) U.S. Cl.
CPC .............. *F16H 19/02* (2013.01); *F01B 9/04* (2013.01); *F02B 75/042* (2013.01); *F02B 75/20* (2013.01);
(Continued)

(58) Field of Classification Search
CPC combination set(s) only.
See application file for complete search history.

(56) References Cited

U.S. PATENT DOCUMENTS

| 1,056,746 A | 3/1913 | Pitts |
| 1,090,647 A | 3/1914 | Pitts |
| (Continued) | | |

FOREIGN PATENT DOCUMENTS

| BE | 1006128 | 5/1994 |
| CN | 1800609 | 7/2006 |
| (Continued) | | |

OTHER PUBLICATIONS

International Search Report and Written Opinion of the International Searching Authority issued from Korean Intellectual Property Office for related International Application No. PCT/US2014/040722, dated Sep. 23, 2014. 12 pages.
(Continued)

*Primary Examiner* — Lindsay Low
*Assistant Examiner* — Ruben Picon-Feliciano
(74) *Attorney, Agent, or Firm* — Proskauer Rose LLP

(57) ABSTRACT

In some aspects, reciprocating engines can include a drive mechanism for generating a rotational motion output from reciprocating piston assembly, where the drive mechanism includes an axially translating y-axis component to reciprocate along a y-axis with the piston assembly; an x-axis component: i) configured to reciprocate substantially perpendicularly to the y-axis, ii) having an internal ring gear, and iii) having an orbital engagement component substantially concentric with the internal ring gear; an output shaft assembly having an output pinion gear engaging tangentially with the internal ring gear; and a stationary engagement component substantially concentric with the output shaft assembly, the stationary engagement component interfacing with the orbital engagement component, the interfacing between the stationary engagement component and the orbital engagement component applying a force to the x-axis
(Continued)

component to maintain contact between the internal ring gear and the output pinion gear.

45 Claims, 29 Drawing Sheets

Related U.S. Application Data

(60) Provisional application No. 61/830,456, filed on Jun. 3, 2013.

(51) Int. Cl.

| | | |
|---|---|---|
| *F02B 75/20* | (2006.01) | |
| *F04B 9/04* | (2006.01) | |
| *F02B 75/04* | (2006.01) | |
| *F01B 9/04* | (2006.01) | |
| *F02B 75/40* | (2006.01) | |
| *F04B 9/02* | (2006.01) | |
| *F04B 19/22* | (2006.01) | |
| *F04B 35/01* | (2006.01) | |
| *F04B 53/14* | (2006.01) | |
| *F04B 53/16* | (2006.01) | |
| *F16C 3/06* | (2006.01) | |

(52) U.S. Cl.
CPC .............. *F02B 75/32* (2013.01); *F02B 75/40* (2013.01); *F04B 9/02* (2013.01); *F04B 9/045* (2013.01); *F04B 19/22* (2013.01); *F04B 35/01* (2013.01); *F04B 53/14* (2013.01); *F04B 53/16* (2013.01); *F01B 9/047* (2013.01); *F16C 3/06* (2013.01)

(56) References Cited

U.S. PATENT DOCUMENTS

| | | | |
|---|---|---|---|
| 3,886,805 | A | 6/1975 | Koderman |
| 4,433,649 | A | 2/1984 | Shin |
| 5,067,456 | A | 11/1991 | Beachley et al. |
| 5,178,038 | A | 1/1993 | Heniges |
| 5,528,946 | A | 6/1996 | Yadegar |
| 5,934,243 | A | 8/1999 | Kopystanski |
| 6,510,831 | B2 | 1/2003 | Wiseman |
| 2002/0185101 | A1 | 12/2002 | Shaw |
| 2005/0217618 | A1 | 10/2005 | Watanabe et al. |
| 2006/0005793 | A1 | 1/2006 | Ward |
| 2006/0207358 | A1 | 9/2006 | Tung |
| 2008/0223320 | A1 | 9/2008 | Chepettchouk |
| 2009/0272259 | A1 | 11/2009 | Cook et al. |
| 2010/0031916 | A1 | 2/2010 | Wiseman |
| 2010/0109343 | A1 | 5/2010 | Lemke et al. |
| 2011/0107998 | A1 | 5/2011 | Xiong et al. |
| 2011/0138939 | A1* | 6/2011 | Carr .................... F01B 9/047 74/32 |
| 2012/0312273 | A1 | 12/2012 | Weverka |
| 2013/0186365 | A1* | 7/2013 | Laimboeck ............... F02F 3/00 123/193.6 |

FOREIGN PATENT DOCUMENTS

| | | |
|---|---|---|
| CN | 1928337 | 3/2007 |
| CN | 100419234 | 9/2008 |
| DE | 348020 | 2/1922 |
| FR | 2927122 | 8/2009 |
| WO | 03087556 | 10/2003 |
| WO | 2004072441 | 8/2004 |
| WO | 2008124816 | 10/2008 |
| WO | 2009120715 | 10/2009 |

OTHER PUBLICATIONS

"Power Delivery Devices for Reciprocating Engines and Related Systems and Methods", Specification, Drawings, and Prosecution History of U.S. Appl. No. 14/294,977, filed Jun. 3, 2014, by Nicholas Sanders which is stored in the United States Patent and Trademark Office.

Shelley, "Planetary gears do away with side forces", Tom Shelley, web address: http://www.shelleys.demon.co.uk/faug04ge.htm, available on online as early as Aug. 7, 2016.

Shelley, "Planetary gears do away with side forces", Eureka Magazine, Tom Shelley, web address: http://www.eurekamagazine.co.uk/design-engineering-features/technology/planetary-gears-do-away-with-side-forces/2773/, published: Aug. 9, 2004.

YouTube Video, titled "Short Stroke Reciprocating Mechanism", purportedly uploaded by user "mekanizmalar" on May 5, 2013, web address: https://www.youtube.com/watch?v=6ACFhNJT2Hs. Screenshot provided (taken on Aug. 22, 2016).

YouTube Video, titled "Super-Efficient Engine (Inventor: Genaro Tabag)", purportedly uploaded by user "Genaro Tabag" on Jul. 28, 2012, web address: https://www.youtube.com/watch?v=PmtWuOzFC98. Screenshot provided (taken on Aug. 22, 2016).

YouTube Video, titled "Major Engine Problems Solved by The Francis Daimler Tabag Engine", purportedly uploaded by user "Genaro Tabag" on Sep. 28, 2012, web address: https://www.youtube.com/watch?v=2Sj9GWs_Bm4. Screenshot provided (taken on Aug. 22, 2016).

Kinematic Models for Design Digital Library: UK032, "Model: UK032 Hypocycloid Two-gear Straight-line Mechanism." Web address: http://kmoddl.library.cornell.edu/model.php?m=346, available on online as early as Aug. 7, 2016.

Kinematic Models for Design Digital Library: S16, "Model: S16 Hypocycloid Straight-line Mechanism." Web address: http://kmoddl.library.cornell.edu/model.php?m=137&movie=hide, available on online as early as Aug. 7, 2016.

* cited by examiner

| Crank Angle | Piston Pressure [BAR/100] | Piston Area | Piston Force [Normalized] | Crank Radius | Sine Crank Angle | Alpha | Cosine Alpha | Torque [DxExFxH] |
|---|---|---|---|---|---|---|---|---|
| 0 | 1.22 | 3.14159 | 0.924242424 | 1 | 0 | 0 | 1 | 0 |
| 9 | 1.32 | 3.14159 | 1 | 1 | 0.156 | 4 | 0.997 | 0.155532 |
| 18 | 1.2 | 3.14159 | 0.909090909 | 1 | 0.309 | 7.5 | 0.991 | 0.278380909 |
| 27 | 0.9 | 3.14159 | 0.681818182 | 1 | 0.453 | 8.8 | 0.988 | 0.305157273 |
| 36 | 0.7 | 3.14159 | 0.530303030 | 1 | 0.587 | 13 | 0.974 | 0.303194394 |
| 45 | 0.48 | 3.14159 | 0.363636364 | 1 | 0.707 | 15 | 0.965 | 0.248092727 |
| 54 | 0.35 | 3.14159 | 0.265151515 | 1 | 0.809 | 16.8 | 0.957 | 0.205283750 |
| 63 | 0.28 | 3.14159 | 0.212121212 | 1 | 0.891 | 18 | 0.951 | 0.179739 |
| 72 | 0.23 | 3.14159 | 0.174242424 | 1 | 0.951 | 19 | 0.946 | 0.156756500 |
| 81 | 0.19 | 3.14159 | 0.143939394 | 1 | 0.987 | 19.5 | 0.943 | 0.133970295 |
| 90 | 0.18 | 3.14159 | 0.136363636 | 1 | 1 | 20 | 0.94 | 0.128181818 |
| 99 | 0.15 | 3.14159 | 0.113636364 | 1 | 0.987 | 19.5 | 0.943 | 0.105766023 |
| 108 | 0.12 | 3.14159 | 0.090909091 | 1 | 0.951 | 19 | 0.946 | 0.081786 |
| 117 | 0.11 | 3.14159 | 0.083333333 | 1 | 0.891 | 18 | 0.951 | 0.070611750 |
| 126 | 0.1 | 3.14159 | 0.075757576 | 1 | 0.809 | 16.8 | 0.957 | 0.058652500 |
| 135 | 0.1 | 3.14159 | 0.075757576 | 1 | 0.707 | 15 | 0.965 | 0.051685985 |
| 144 | 0.095 | 3.14159 | 0.071969697 | 1 | 0.587 | 13 | 0.974 | 0.041147811 |
| 153 | 0.09 | 3.14159 | 0.068181818 | 1 | 0.453 | 8.8 | 0.988 | 0.030515727 |
| 162 | 0.085 | 3.14159 | 0.064393939 | 1 | 0.309 | 7.5 | 0.991 | 0.019718648 |
| 171 | 0.08 | 3.14159 | 0.060606061 | 1 | 0.156 | 4 | 0.997 | 0.009426182 |
| 180 | 0.075 | 3.14159 | 0.056818182 | 1 | 0 | 0 | 1 | 0 |

AVERAGE TORQUE  0.122076157

FIG. 4

| Crank Angle [degrees] | Piston Pressure [BAR/100] | Piston Area | Piston Force [Normalized] | Crank Radius | Torque [DxE] |
|---|---|---|---|---|---|
| 0 | 1.22 | 3.14159 | 0.924242424 | 1 | 0.924242424 |
| 9 | 1.32 | 3.14159 | 1 | 1 | 1 |
| 18 | 1.2 | 3.14159 | 0.909090909 | 1 | 0.909090909 |
| 27 | 0.9 | 3.14159 | 0.681818182 | 1 | 0.681818182 |
| 36 | 0.7 | 3.14159 | 0.530303030 | 1 | 0.530303030 |
| 45 | 0.48 | 3.14159 | 0.363636364 | 1 | 0.363636364 |
| 54 | 0.35 | 3.14159 | 0.265151515 | 1 | 0.265151515 |
| 63 | 0.28 | 3.14159 | 0.212121212 | 1 | 0.212121212 |
| 72 | 0.23 | 3.14159 | 0.174242424 | 1 | 0.174242424 |
| 81 | 0.19 | 3.14159 | 0.143939394 | 1 | 0.143939394 |
| 90 | 0.18 | 3.14159 | 0.136363636 | 1 | 0.136363636 |
| 99 | 0.15 | 3.14159 | 0.113636364 | 1 | 0.113636364 |
| 108 | 0.12 | 3.14159 | 0.090909091 | 1 | 0.090909091 |
| 117 | 0.11 | 3.14159 | 0.083333333 | 1 | 0.083333333 |
| 126 | 0.1 | 3.14159 | 0.075757576 | 1 | 0.075757576 |
| 135 | 0.1 | 3.14159 | 0.075757576 | 1 | 0.075757576 |
| 144 | 0.095 | 3.14159 | 0.071969697 | 1 | 0.071969697 |
| 153 | 0.09 | 3.14159 | 0.068181818 | 1 | 0.068181818 |
| 162 | 0.085 | 3.14159 | 0.064393939 | 1 | 0.064393939 |
| 171 | 0.08 | 3.14159 | 0.060606061 | 1 | 0.060606061 |
| 180 | 0.075 | 3.14159 | 0.056818182 | 1 | 0.056818182 |

AVERAGE TORQUE 0.290584416

FIG. 5

POWER DELIVERY DEVICES FOR RECIPROCATING ENGINES AND RELATED SYSTEMS AND METHODS

RELATED APPLICATIONS

This application is a continuation-in-part of U.S. patent application Ser. No. 14/294,977 filed Jun. 3, 2014, entitled "Power Delivery Devices for Reciprocating Engines and Related Systems and Methods," which claims the benefit of U.S. Provisional Patent Application Ser. No. 61/830,456 filed Jun. 3, 2013, entitled "Power Delivery Devices for Reciprocating Engines and Related Systems and Methods," the contents of both of these applications are hereby incorporated herein by reference in their entirety.

TECHNICAL FIELD

This disclosure generally relates to reciprocating engines, and more particularly to power delivery devices for reciprocating engines, and to related systems and methods.

BACKGROUND

A reciprocating engine generally uses a crankshaft to convert the linear reciprocating motion of one or more pistons translating within cylinders into the rotational motion of the crankshaft and vice versa. For example, the internal combustion engine (IC engine) is the most common type of reciprocating engine. Reciprocating engines are generally used to convert the chemical energy released during the combustion of various fuels (such as gasoline) or thermal energy (such as energy derived from steam) into kinetic energy (e.g., mechanical rotating motion), which can be more readily usable to move things (e.g., propel objects). The crankshaft of a reciprocating engine is typically the engine element that is connected to output devices used to move various devices or vehicles, such as automobiles, generators, trucks, airplanes, welders, ships, bulldozers, motorcycles, boats, etc.

SUMMARY

In some aspects, reciprocating engines can include an engine block defining at least one cylinder; at least one piston assembly reciprocating within the at least one cylinder; and a drive mechanism for generating a rotational motion output from a reciprocating motion input of the piston assembly, where the drive mechanism includes an axially translating y-axis component configured to reciprocate along a y-axis with the reciprocating motion input of the piston assembly relative to a base to which the y-axis component is slidingly attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to a base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain contact between the internal ring gear and the output pinion gear as the internal ring gear orbits about and drives the output pinion gear to drive a drive gear of an engine drive shaft assembly.

Embodiments can include one of more of the following features.

The reciprocating engine can be an opposed piston multiple cylinder engine, wherein the axially translating y-axis component is coupled to two opposing pistons. The stationary engagement component comprises a rotatable element. The stationary engagement component can include a recess with which the orbital engagement component interfaces. The orbital engagement component can include a gear or roller. A pitch diameter of the output pinion gear can be substantially equal to a stroke length of the reciprocating engine and a pitch diameter of the internal ring gear can be substantially equal to two times the stroke length of the reciprocating engine and the sum of respective pitch diameters of the orbital engagement component and the stationary engagement component can be substantially equal to a stroke length of the reciprocating engine. The output shaft assembly can include a torque transfer gear which transfers torque from the output shaft assembly to the drive gear of the engine drive shaft assembly. The torque transfer gear comprises a sprocket and chain assembly. The base can include a portion of the engine block. The y-axis component can include a linear bearing surface along which the y-axis component slides relative to the base with the reciprocating motion input. The linear bearing surface can limit the y-axis component from moving relative to the base except for in the direction of the reciprocating motion input. The x-axis component can include a linear bearing surface along which the x-axis component slides substantially perpendicularly to the direction of the reciprocating motion input.

In some aspects, drive mechanisms for generating a rotational motion output from a reciprocating motion input of a piston assembly of a reciprocating engine can include an axially translating y-axis component configured to reciprocate along a y-axis with the reciprocating motion input of the piston assembly relative to a base to which the y-axis component is attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to the base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain tangential engagement between the internal ring gear and the output pinion gear as the internal ring gear orbits about and drives the output pinion gear to drive a drive shaft of the engine.

In some aspects, drive mechanisms for generating a rotational motion output from a reciprocating motion input and/or for generating a reciprocating motion output from a rotational motion input can include: an axial translating y-axis component configured to reciprocate along a y-axis with the reciprocating motion input relative to a base to which the y-axis component is attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to the base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain tangential engagement between the internal ring gear and the output pinion gear as the internal ring gear orbits about the output pinion gear.

In some aspects, reciprocating compressor or pump can include: a cylinder block defining at least one cylinder; at least one piston assembly reciprocating within the at least one cylinder; and a drive mechanism for generating a reciprocating motion of the piston assembly from a rotational motion input, where the drive mechanism includes: an axially translating y-axis component configured to reciprocate along a y-axis with the reciprocating motion input of the piston assembly relative to a base to which the y-axis component is slidingly attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an input shaft assembly rotatingly coupled to a base and having an input pinion gear that interfaces with and engages tangentially with the internal ring gear; and a stationary engagement component coupled to, or integrally formed along, the base and substantially concentric with the input shaft assembly, the stationary engagement component interfacing and tangentially engaging with the orbital engagement component of the x-axis component, the interfacing between the stationary engagement component and the orbital engagement component of the x-axis component applying a force to the x-axis component to maintain contact between the internal ring gear and the output pinion gear as the internal ring gear orbits about and is driven by the input pinion gear of the input shaft assembly.

Embodiments can include one or more of the following features.

The reciprocating engine can include an opposed piston multiple cylinder engine, wherein the axially translating y-axis component is coupled to two opposing pistons. The reciprocating engine can be an internal combustion engine. The reciprocating engine can be an in-line multiple cylinder combustion engine. The stationary engagement component can be a rotatable element. The rotatable element can be a gear. The stationary engagement component can be a recess with which the orbital engagement component interfaces. The orbital engagement component can be a gear or roller.

The orbital engagement component can include a shaft device. The shaft device can be fixedly coupled or integrally formed within the x-axis component. A pitch diameter of the output pinion gear can be substantially equal to a stroke length of the reciprocating engine and a pitch diameter of the internal ring gear can be substantially equal to two times the stroke length of the reciprocating engine and the sum of respective pitch diameters of the orbital engagement component and the stationary engagement component can be substantially equal to a stroke length of the reciprocating engine. The output shaft assembly can include a torque transfer gear which transfers torque from the output shaft assembly to the drive shaft. The torque transfer gear can include a sprocket and chain assembly. The base can be a portion of an engine block. The base can be a component attached to the engine block. The y-axis component can include a linear bearing surface along which the y-axis component slides relative to the base with the reciprocating motion. The linear bearing surface can limit the y-axis component from moving relative to the base except for in the direction of the reciprocating motion input. The x-axis component can include a linear bearing surface along which the x-axis component slides substantially perpendicularly to the direction of the reciprocating motion input.

In some aspects, methods of converting an axial force from a reciprocating motion input of a reciprocating element to a torque applied to an output shaft assembly and/or converting a torque applied from the output shaft assembly to an axial force to the reciprocating motion of the reciprocating element can include: applying an axial force to move an axially translating y-axis component configured to reciprocate along a y-axis with the reciprocating motion input of a piston assembly relative to a base to which the y-axis component is slidingly attached; transmitting the axial force through an x-axis component which is slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; transmitting the axial force to an output shaft assembly rotatingly coupled to the base and having an output pinion gear that interfaces with and engages tangentially with the internal ring gear, wherein a stationary engagement component coupled to, or integrally formed along, the base and substantially concentric with the output shaft assembly interfaces with and tangentially engages with the orbital engagement component of the x-axis component, the interfacing between the stationary engagement component and the orbital engagement component of the x-axis component applying a force to the x-axis component to maintain tangential engagement between the internal ring gear and the output pinion gear as the axial force is transmitted from the internal ring gear to the output pinion gear as consistently applied torque and vice versa.

Embodiments can include one or more of the following.

The stationary engagement component can include a rotatable element. The orbital engagement component can include a gear or roller. The y-axis component can include a linear bearing surface along which the y-axis component slides relative to the base with the reciprocating motion. The x-axis component can include a linear bearing surface along which the x-axis component slides substantially perpendicularly to the direction of the reciprocating motion input.

In some aspects, methods of converting a reciprocating axial force from a reciprocating motion of a reciprocating element into a torque applied to an output shaft can include: applying the axial force to slide an axial translating component with the reciprocating motion of the reciprocating element relative to the output shaft, wherein the axial translating component is axially coupled to an internal ring gear engaged with the output shaft and the internal ring gear is configured to slide relative to the axial translating component in a direction substantially perpendicular to the reciprocating motion of the reciprocating element; maintaining contact between the internal ring gear and the output shaft using an idler assembly fixed substantially concentrically relative to the internal ring gear; and as the axial translating component and internal ring gear coupled thereto slide axially relative to the output shaft, permitting the internal ring gear to slide in the direction substantially perpendicular to the reciprocating motion of the reciprocating element under applied by the idler assembly, thereby causing the internal ring gear to orbit about, and consistently apply the torque to, the output shaft during reciprocation of the reciprocating element.

Embodiments can include one or more of the following features.

The permitting the internal ring gear to slide in the direction substantially perpendicular to the reciprocating motion of the reciprocating element can include permitting the internal ring gear to move relative to the axial translating component along one or more bearing surfaces. The maintaining contact between the internal ring gear and the output shaft using the idler assembly can include applying a force, using a stationary engagement component coupled to, or integrally formed along, a base and substantially concentric with the output shaft, to an orbital engagement component disposed substantially concentric with the internal ring gear.

In some aspects, methods of extracting mechanical work from an operating reciprocating engine can include applying a torque moment to an output shaft of the reciprocating engine using a maximum length torque moment arm that remains a substantially constant length as a reciprocating element of the engine reciprocates and the output shaft rotates.

Embodiments can include one or more of the following features.

The substantially constant length can be substantially the same as a crankshaft radius of a crankshaft of the reciprocating engine. The using a maximum length torque moment arm can include coupling the reciprocating element of the engine to the output shaft using a substantially constant length moment arm. The extracting mechanical work can further include increasing an output power of the reciprocating engine by applying the torque moment using the maximum length torque moment arm. The maximum length torque moment arm can include a moment arm that remains at its maximum length throughout a rotation of the output shaft. For example, the coupling the reciprocating element of the engine to output shaft can include coupling the output shaft to a rotating torque delivery device defining a substantially constant torque moment arm, the rotating torque delivery devices being configured to interface with the reciprocating element of the engine. The engine can be an internal combustion engine.

The applying the torque moment to the output shaft of the reciprocating engine using the maximum length torque moment arm that remains a substantially constant length can include coupling a translating member to the reciprocating element of the reciprocating engine; and coupling the translating member to the output shaft using the maximum length torque moment arm. For example, the torque moment arm can be substantially perpendicular to a reciprocating axis of the translating member to apply torque to the rotatable power output member. The torque moment arm that remains a substantially constant length can include a rotatable gear device coupled to the power output member and a gear rack coupled to the translating member.

In some aspects, a reciprocating engine can include at least one substantially invariant length torque moment arm that remains substantially constant during reciprocation of a reciprocating element and a rotation of an output shaft of the engine.

Embodiments can include one or more of the following features.

The substantially invariant length torque moment arm can have a length equivalent to a crankshaft radius of a crankshaft of the engine. The engine can also include a device to convert a reciprocating motion of the reciprocating element of the engine into a rotational motion of the output shaft using the substantially invariant length torque moment arm. The engine can also include at least one reciprocating piston disposed within a cylinder, the piston being connected at one end to a crankshaft of the engine by a connecting rod and also additionally being connected to the output shaft by the substantially invariant length torque moment arm. For example, the substantially invariant length torque moment arm can be formed at least in part by a combination of a rotating device coupled to the output shaft and a translating element coupled to the reciprocating piston, where the rotating device defines the substantially invariant length torque moment arm. The rotating device can include at least one of a pulley, a gear, or a sprocket. The translating element can include at least one of a cable, a chain, a belt, a pull rod, or a gear rack. The engine can also include a clutch device disposed between the reciprocating piston and the output shaft. The engine can also include an energy storage device to temporarily store energy produced by a reciprocating element of the engine and subsequently release the energy to the output shaft as the reciprocating element travels within the engine.

The substantially invariant length torque moment arm can include a torque moment arm that generates the torque: i) being defined between the rotational axis of the output shaft and a contact point between a translating member and a rotatable member; ii) being generally perpendicular to the motion of the translating member; and iii) remaining a substantially constant length during reciprocation of a reciprocating element of the engine.

In some aspects, a power delivery device to couple to a reciprocating element of a reciprocating engine can include an axially translating tension member to couple to and translate with the reciprocating element; and a rotatable member coupled to a power output element and interfacing with the translating tension member, the translating tension member providing an axial force to the rotatable member that applies a torque to the power output element during an axial motion of the translating tension member using a substantially constant length torque moment arm.

Embodiments can include one or more of the following features.

The torque moment arm that generates the torque can: i) be defined between the rotational axis of the power output element and a contact point between the translating tension member and the rotatable member; ii) be generally perpendicular to the motion of the translating tension member; and iii) remain a substantially constant length during reciprocation of the reciprocating element. The rotatable member can be coupled to the output element using a clutch device configured to permit the rotatable member to freely rotate relative to the output element in the second direction. The rotatable member can include a gear device and the translating tension member can include a gear rack that interfaces with the gear device.

In some embodiments, the reciprocating element can be a reciprocating piston; the power output element can be a rotating power output shaft other than a crankshaft of the engine; the translating tension member can be a pull rod device to connect to the reciprocating piston and translate based on a reciprocating motion of the piston; the engine can include a linear gear device coupled to the pull rod to translate with the pull rod; the engine can include a rotatable pinion gear coupled to the output shaft and configured to interface with the linear gear device; and the engine can include a one-way clutch device disposed between the output shaft and the pinion gear to engage the output shaft when the pinion gear rotates in a first direction of a piston motion towards a crankshaft by which it rotates, wherein a distance between a rotation axis of the output shaft and a contact region between the linear gear device and the pinion gear remains substantially constant as the piston reciprocates in the engine.

In some aspects, a reciprocating engine can include at least one piston and cylinder, the at least one piston being connected at one end to a crankshaft via a connecting rod and additionally connected to an output shaft via a substantially invariant length torque moment arm, the engine including an axially translating element to couple to and translate with the reciprocating piston; and a rotatable member coupled to the output shaft and interfacing with the translating element, the translating element providing an axial force to the rotatable member that applies a torque to the output shaft during an axial motion of the translating element, the substantially invariant length torque moment arm: i) being defined between the rotational axis of the output shaft and an interface region between the translating element and the rotatable member; and ii) being generally perpendicular to the motion of the translating element.

Embodiments can include one or more of the following features.

The substantially invariant length torque moment arm can remain substantially unchanged during inward motions of the piston towards the crankshaft and outward motions of the piston away from the crankshaft. The rotatable member can include a gear device and the axially translating element can include a tension device to engage the dear device. The engine can also include a clutch device to selectively engage the output shaft based on a direction of motion of the translating element. The at least one piston and cylinder comprises four in-line piston and cylinders, each of the pistons being configured to engage and rotate the output shaft via a substantially invariant length torque moment arm.

In some aspects, a power delivery device configured to couple to a reciprocating element of a reciprocating engine can include an axially translating tension member to couple to and translate with the reciprocating element; and a rotatable member coupled to a power output element and interfacing with the translating tension member, the translating tension member providing an axial force to the rotatable member that applies a torque to the power output element during an axial motion of the translating tension member, where a torque moment arm that generates the torque: i) is defined between the rotational axis of the power output element and a contact point between the translating tension member and the rotatable member; ii) is generally perpendicular to the motion of the translating tension member; and iii) remains a substantially constant length during reciprocation of the reciprocating element.

Embodiments can include one or more of the following features.

The translating tension member can include a pull rod. The rotatable member can be configured to interface with the translating tension member to engage and rotate the output element when the translating tension member moves in a first direction and to disengage the output element to freely rotate relative to the output element when the translating tension member moves in a second direction that is opposite the first direction. The rotatable member can be coupled to the output element using a clutch device configured to permit the rotatable member to freely rotate relative to the output element in the second direction. For example, the clutch device can be a sprag clutch. The rotatable member can be a gear device and the translating tension member can be a gear rack that interfaces with the gear device. The rotatable member can include a sprocket or pulley and the translating tension member can include a chain or a cable element engageable with the sprocket or pulley wheel. The power output element can include a rotating output shaft. The power delivery device can include a sealing member to limit a loss of cylinder pressure of the reciprocating engine through an opening through which the power delivery device couples to the reciprocating element. The sealing member can include a labyrinth sealing member. The power delivery device can include an energy storage device to temporarily store energy produced by the reciprocating element and subsequently release the energy to the power deliver device as the reciprocating element travels within the engine. For example, the energy storage device can include a spring element coupled between a translating tension member coupled to the reciprocating element and a motion transfer device. The reciprocating element can be a piston configured to reciprocate within a cylinder of the reciprocating engine.

In some aspects, a reciprocating engine can include at least one reciprocating piston within a cylinder, the at least one reciprocating piston being connected at one end to a crankshaft via a connecting rod and connected to an output shaft at another end via a substantially invariant length torque moment arm, where the engine includes an axially translating element to couple to and translate with the reciprocating piston; and a rotatable member coupled to the output shaft and interfacing with the translating element, the translating element providing an axial force to the rotatable member that applies a torque to the output shaft during an axial motion of the translating element, the substantially invariant length torque moment arm: i) being defined between the rotational axis of the output shaft and an interface region between the translating element and the rotatable member; and ii) being generally perpendicular to the motion of the translating element.

Embodiments can include one or more of the following features.

The axially translating element can include a pull rod secured to the piston. The axially translating element can include a linear gear device. The linear gear device can include a gear rack. The rotatable member can include a gear to engage the linear gear device. The engine can include a clutch device coupled between the output shaft and the axially translating element. The clutch device can include a one directional clutch. The one directional clutch can include a freewheeling clutch device. The axially translating element can include a gear rack coupled to a pull rod and the rotatable member can include a pinion gear, to engage the gear rack, coupled to the output shaft via a clutch device, wherein via a translating motion of the pull rod, the gear rack rotates the output shaft. The clutch device can engage the output shaft substantially only during a down stroke of the piston towards the crankshaft. The clutch device can engage the output shaft as the piston travel inwardly towards the crankshaft and disengages the output shaft as the piston travels outwardly away from the crankshaft. The substantially invariant length torque moment arm can be defined between the rotational axis of the output shaft and the interface region between the translating element and the rotatable member and remain substantially unchanged during inward motions of the piston towards the crankshaft and outward motions of the piston away from the crankshaft. The engine can also include an energy storage device positioned between the axially translating element and the output shaft. The at least one reciprocating piston and cylinder can include four in-line piston and cylinders, each of the pistons being configured to engage and rotate the output shaft via a substantially invariant length torque moment arm.

In some aspects, methods of extracting rotatable power from a reciprocating engine can include coupling a translating member to a reciprocating member of the reciprocating engine; and coupling the translating member to a rotatable power output member using a substantially consistent length moment arm perpendicular to a reciprocating axis of the translating member to apply torque to the rotatable power output member.

Embodiments can include one or more of the following features.

The substantially consistent length moment arm can include a rotatable gear device coupled to the power output member and a gear rack coupled to the translating member. The engine can be an internal combustion engine. The translating member can disengage the rotatable output member when the translating member travels as a result of an outward motion of the reciprocating member. The rotatable power output member (e.g., output shaft) can include a rotating shaft other than a crankshaft of the engine.

In some aspects, a power delivery device configured to couple to a reciprocating piston of a reciprocating engine can include: a rotating power output shaft other than a crankshaft of the engine; a pull rod device to connect to the reciprocating piston and translate based on a reciprocating motion of the piston; a linear gear device coupled to the pull rod to translate with the pull rod; a rotatable pinion gear coupled to the output shaft and configured to interface with the linear gear device; and a one-way clutch device disposed between the output shaft and the pinion gear to engage the output shaft when the pinion gear rotates in a first direction of a piston motion towards a crankshaft by which it rotates, wherein a distance between a rotation axis of the output shaft and a contact region between the linear gear device and the pinion gear remains substantially constant as the piston reciprocates in the engine.

Embodiments can include one or more of the following features.

An energy storage element can be coupled between the pull rod and the linear gear device. The distance between a rotation axis of the output shaft and a contact region between the linear gear device and the pinion gear can be generally perpendicular to a translating axis of the linear device. The linear gear device can include a gear rack. The linear gear device can be a chain.

In some aspects, methods of extracting rotatable power from a reciprocating engine can include coupling a translating gear rack to a reciprocating piston of the reciprocating engine; coupling a rotating pinion gear to a rotating output shaft other than a crankshaft of the engine, the pinion gear interfacing with the gear rack to rotate the pinion gear in response to a translating motion of the piston and the gear rack; and using a clutch device, selectively engaging the output shaft with the pinion gear to rotate the output shaft only when the piston travels towards a crankshaft to which the piston is coupled, wherein a torque moment arm distance between a rotation axis of the output shaft and a contact region between the gear rack and the pinion gear remains substantially constant as the piston reciprocates in the engine.

In some aspects, methods herein can increase an output torque (e.g., an average output torque) of an operating reciprocating engine by maintaining a substantially constant length torque moment arm that drives an output shaft of the reciprocating engine. The engine can be an internal combustion engine. The engine can be an external combustion engine.

In some aspects, a reciprocating engine can include at least one piston and cylinder, said piston being connected on one end to a crankshaft via a connecting rod, said piston additionally being connected to an output shaft via a substantially invariant length torque moment arm. The moment arm can include a pull rod/gear rack/pinion gear/clutch arrangement. The gear rack can be disposed on the pull rod, the pinion gear is coupled to the output shaft via the clutch, and the gear rack is engageable to the pinion gear to rotate the output shaft. The clutch can include a freewheeling clutch. The clutch can include a sprag clutch.

In some aspects, an energy storage device can be positioned between a pull rod and an output shaft, the pull rod configured to couple to a reciprocating member of a reciprocating engine. The energy storage device can include springs (e.g., Belleville springs).

In some aspects, a pull rod pressure sealing device can be implemented to limit pressure loss of a reciprocating engine cylinder through an opening through which a pull rod enters the cylinder. The pressure sealing device can include a Labyrinth sealing means.

In some aspects, an automobile can include a reciprocating engine comprising at least one piston and cylinder, said piston being connected on one end to a crankshaft via a connecting rod, said piston additionally being connected to an output shaft via a substantially invariant length torque moment arm. The automobile can include one or more of light trucks, delivery trucks, fire trucks, over-the-road trucks, motorcycles, and passenger cars.

In some aspects, an off-road piece of equipment can include a reciprocating engine comprising at least one piston and cylinder, said piston being connected on one end to a crankshaft via a connecting rod, said piston additionally being connected to an output shaft via a substantially invariant length torque moment arm. The off-road piece of equipment can include one or more of farm tractors, construction equipment, trucks, graders, cranes, bulldozers, welders, and pumps.

In some aspects, a generator set (e.g., an electric generator set) can include a reciprocating engine having at least one piston and cylinder, said piston being connected on one end to a crankshaft via a connecting rod, said piston additionally being connected to an output shaft via a substantially invariant length torque moment arm.

In some aspects, a boat or ship can include a reciprocating engine with at least one piston and cylinder, said piston being connected on one end to a crankshaft via a connecting rod, said piston additionally being connected to an output shaft via a substantially invariant length torque moment arm.

In some aspects, an airplane or helicopter can include a reciprocating engine with at least one piston and cylinder, said piston being connected on one end to a crankshaft via a connecting rod, said piston additionally being connected to an output shaft via a substantially invariant length torque moment arm.

In some aspects, a power delivery device can be configured to couple to a reciprocating element of a reciprocating engine, and configured to couple to a power output element via a substantially consistent length moment arm.

Embodiments can include one or more of the following features.

The power delivery device can include a pull rod coupled to the reciprocating element. The power delivery device can include a rotatable member engagable with the pull rod, the rotatable member being configured to rotate the power output element. The rotatable member can be configured to engage and rotate the pull rod in substantially only in a first direction and permit the rotatable member to freely rotate relative to the output element in a second direction that is opposite the first direction. The rotatable member can be coupled to the output element using a clutch device configured to permit the rotatable member to freely rotate relative to the output element in the second direction. The clutch device can include a sprag clutch. The rotatable member can include a gear device and the pull rod can include a gear rack engageable with the gear device. The power output element can include an output shaft. The power delivery device can include a sealing member to limit a loss of cylinder pressure of the reciprocating engine through an opening through which the power delivery device couples to the reciprocating element. The sealing member can include a labyrinth sealing member. The power delivery device can include an energy storage device temporarily store energy produced by the reciprocating element and subsequently release the energy to the power delivery device as the reciprocating element travels within the engine. The energy storage device can include a spring element coupled between a pull rod and a motion transfer device. The spring element can include one or more Belleville springs and the motion transfer device can include a gear rack engageable with a rotatable gear coupled to the output element. The reciprocating element is a piston configured to reciprocate within a cylinder. In some aspects, a reciprocating engine can include the power delivery device. In some aspects, a kit for a reciprocating engine to increase power output of the reciprocating engine can include the power delivery device.

In some aspects, methods of extracting rotatable power from a reciprocating engine can include: coupling a translating member to a reciprocating member of the reciprocating engine; and coupling the translating member to a rotatable power output member using a substantially constant maximum length moment arm.

Embodiments can include one or more of the following features.

The substantially constant moment arm can include a rotatable gear device coupled to the power output member and a gear rack coupled to the translating member. The moment arm can include a pull rod/chain/sprocket/clutch arrangement. The moment arm can include a pull rod/cable/pulley/clutch arrangement.

In some aspects, methods of increasing an output power (e.g., an average output power) of an operating reciprocating engine include maintaining a substantially constant length torque moment arm that drives an output shaft of the reciprocating engine.

In some aspects, methods of increasing a thermal efficiency of an operating reciprocating engine can include maintaining a substantially constant length torque moment arm that drives an output shaft of the reciprocating engine.

In some aspects, the power delivery devices described herein can be used as a hybrid energy storage system where stored rotational energy is used to generate useful power (e.g., mechanical (e.g., rotational) power) as a result of both the rotation of the output shaft coupled to a rotation of a crankshaft of a reciprocating engine during a piston downstroke of the engine and also to generate useful power by utilizing the stored energy of the rotating output shaft which is configured to disengage from the piston (e.g., using a one way clutch) so that it can continue to rotate even if the crankshaft of the reciprocating engine has decelerated (e.g., or stopped). That is, as discussed below, the output shaft can be coupled to the reciprocating engine (e.g., to a piston of the engine) in a manner so that the output shaft is only coupled to the piston during a downstroke of the piston but is able to continue to freely rotate during an upstroke of the piston. The stored energy of the freely rotating power output shaft once disengaged from the crankshaft can be used to create useful power to drive attached loads when the engine decelerates or stops.

As discussed herein, in some cases, the output shaft can have a potentially different rotational speed than the engine crankshaft during use. Therefore, a difference in rotational speed between the output shaft and the connection point between the piston and the clutch device (e.g., at the pulley or sprocket coupled to an outer portion of the clutch device (or whichever portion of the clutch device that is not directly coupled to the output shaft)) can also exist during use. As a result of the reciprocating motion of the piston (i.e., and the associated pulsing of the outer portion of the clutch device), the resulting motion of the output shaft based on the input from the outer portion of the clutch device can include a pulsing rotation that varies in speed and torque as the reciprocating piston moves throughout its stroke. Therefore, in some embodiments, the power delivery device can include a coupling (e.g., a fluid coupling (e.g., a torque convertor)) connected in between the power delivery device and the system to which the power delivery device is providing power, which can help reduce (e.g., minimize) negative effects of such pulsing motion and may also serve as a torque multiplying device (e.g., a torque multiplying torque convertor). For example, the coupling can be connected to an end of the power delivery device output shaft and a shaft of an automobile drivetrain, a generator input shaft, or other similar system input.

Definitions

The following definitions are generally used in the engineering industry and can be found in many text books and Internet sources. They are provided here to be used for example purposes only and are not intended to be limiting to this disclosure.

Torque is a twisting force applied to an object, such as a wheel or a crankshaft. Note that motion is not required for torque to exist. For example, if you stand on a lug wrench that is attached to a frozen lug bolt, you are applying a torque to that bolt even though there may be no movement. For simplicity purposes, torque herein is measured and described in units of pounds-force feet (lbf-ft), meaning the equivalent of a given force, in pounds, acting on the end of a lever of length in feet. For example, standing with 180 pounds of body weight on a lug wrench having a one foot long moment arm yields a resulting torque of 180 lbf-ft. Additionally, a child of 90 pounds standing on a two-foot lug wrench applies the same resulting torque.

Work is the application of force over a distance. It is noted that the units used to describe work are the same as torque (e.g., pounds times feet) but the work units can be written as ft-lb to distinguish from a torque value. The practical difference between torque and work is that in this or work case, the distance units (e.g., the "feet" part) describes length (e.g., feet) of movement, whereas for torque, the distance describes the length of the moment arm. If a car is pushed with 100 pounds of force for 30 feet, then the work done is 3000 ft-lb of work. An easier example is lifting a weight (in pounds) by a given distance (in feet). If you use some sort of mechanical advantage, such as a winch, you will do the same amount of work because by halving the effort required, you will have to double the distance through which you apply the force to achieve the same objective.

Power is the application of work over a finite time. 550 ft-lb of work in one second is the equivalent of one horsepower (HP).

So, the following descriptions and calculations are used to explain the conversion to get from torque to horsepower. Pushing with 87.5 pounds (force) on the end of our 1-foot moment arm lug wrench applies a torque of 87.5 lbf-ft. Since there is no motion yet, no work or power is produced. However, consider the lug bolt loosens slightly and starts to turn but that same 87.5 pounds of force is needed to keep the wrench turning. For every revolution of the wrench, 87.5 pounds of force is applied over a distance of (2*n*1 foot) or 6.28 feet (which is the circumference of the circle that the hand pushing the wrench is making). Therefore, a total of 550 ft-lb of work is generated to rotate the wrench. It is only when this system is actually moving that work is being performed. From calculating the work, it is a quick step to say that if the work is applied fast enough to turn that wrench one revolution per second, then 550 ft-lb of work is performed per second, which means one horsepower of power is being applied.

By the definitions it can be seen that HP is directly proportional to torque and RPM. "Directly proportional" means there may be a multiplier involved. Using the above example numbers, remembering that 1 revolution per second is 60 RPM, the relationship between HP, torque, and RPM can be determined as shown below:

torque*RPM*constant=hp 87.5 lbf-ft*60 rev/min*$X$=1 hp $X$=1/(60*87.5)=1/5250 torque*RPM*1/5250=hp hp=(torque*RPM)/5250

For internal combustion engines, torque is typically given at a certain RPM because the engine cannot generate torque when it is not rotating. Once the engine is running fast enough to sustain its own operation, the force that exerted against a load can be measured, and the speed at which the engine is turning can be measured. Therefore, the torque (and therefore power) values can be determined.

In some embodiments, the term clutch device, which can include a one-way freewheeling clutch, a bearing clutch, such as a sprag clutch (e.g., a CSK model one-way bearing), or other similarly suitable one-way clutch devices, is used to describe a device that disengages the driveshaft (i.e., the crankshaft of a reciprocating engine according to the description herein) from the driven shaft (i.e., the output shaft of the power delivery devices described herein) when the driven shaft rotates faster than the driveshaft, for example, when the reciprocating engine is decelerated and the crankshaft slows down, as discussed below.

Identified Problems with Conventional Reciprocating Engine Design

In continuous operation, crankshaft type reciprocating engines convert the reciprocating motion of the pistons into the rotational motion of a load connected crankshaft. A reciprocating internal combustion (IC) engine uses the crankshaft mechanism to convert the explosive energy released within the combustion chamber (e.g., cylinder) via the combustion of fossil fuels into rotational mechanical energy used to propel objects. External combustion (EC) engines, such as steam engines, also use the crankshaft mechanism. Whether an IC engine is 2 or 4 (or more) cycle and/or whether it is gasoline, propane, natural gas, or diesel (or other types of fuels or heat cycles), most reciprocating engines use the crankshaft to convert the reciprocating motion (power) of the pistons into rotational mechanical motion (power).

Simply stated, the systems and methods discussed herein are directed to separating the reciprocating engine's output torque (power) from the crankshaft and to deliver that torque (power) through an alternate power delivery device (e.g., powertrain) path, which has a relatively invariant (e.g., consistent or constant) maximum length moment arm producing the torque for the output shaft.

Such systems and methods are expected to be advantageous for at least the following reasons.

The crankshaft in a typical reciprocating engine, as its primary function, returns each of the one or more pistons of the engine to a previous position in their respective cylinder during the various cycles of the engine. In addition, the crankshaft is secondarily used to deliver the rotational energy to whatever load the engine is coupled to. The crankshaft performs effectively in returning pistons to their previous positions (e.g., top dead center), but it is generally inefficient in delivering the potential torque and power to the engine's applied load. A major cause for this inefficiency is a fundamental varying of the torque moment arm length as the crankshaft rotates. The length varies from zero to a maximum each half rotation of the crankshaft. Therefore, a power delivery device for a reciprocating engine that uses a substantially constant maximum length moment arm to generate torque and power for a power output shaft of the engine is expected to produce greater (e.g., significantly greater) torque and power relative to a similarly sized engine that utilizes a conventional crankshaft as a power output shaft.

Therefore, the systems and methods described herein can be utilized to create more energy efficient engines, which can be designed and manufactured in reduced size, using smaller components and still produced a desired level of power. In some cases, these improvements in efficiency and power output are expected to also have a direct influence on fuel consumption and efficiency, which can result in more fuel efficient engines. For example, for automobile applications, such increases in fuel efficiency is expected to impact ownership costs for operating an automobile having a power delivery device with a constant moment arm, as described herein.

BRIEF DESCRIPTION OF DRAWINGS

FIG. 4 is a table of calculations used to estimate torque produced in a conventional internal combustion engine at various crank angles during a power stroke.

FIG. 5 is a table of calculations used to estimate torque produced in an internal combustion engine utilizing a constant moment arm to produce torque at various crank angles during a power stroke.

DETAILED DESCRIPTION

Figure 1A:
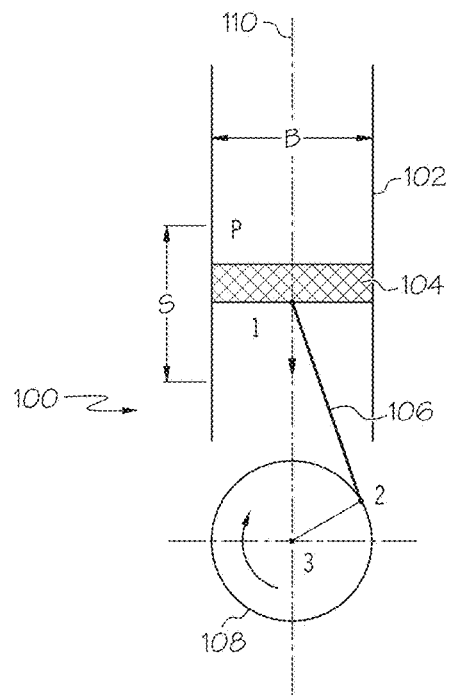
FIG. 1a is schematic of a conventional reciprocating engine.
Figure 1B:
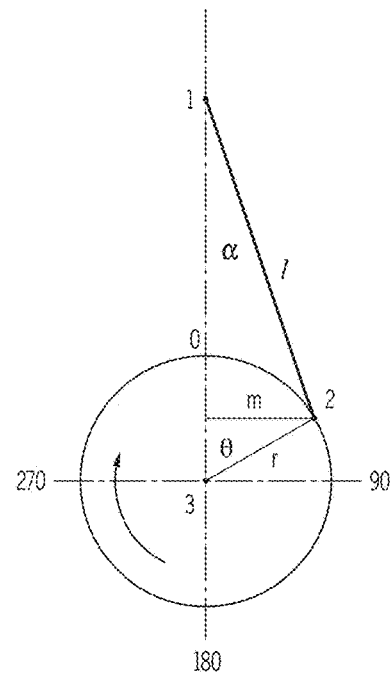
FIG. 1b is an enlarged schematic view of the reciprocating engine of FIG. 1a illustrating a moment arm that varies as a crankshaft rotates.

FIGS. 1a and 1b illustrate a schematic of a reciprocating engine 100 having a fixed cylinder 102, a piston 104, a connecting rod 106, and a crankshaft 108. As illustrated, the piston 104 is moving downwardly within the cylinder 102 during a power stroke and the crankshaft 108 is rotating clockwise. A typical power stroke in an IC engine continues from a crank angle (θ) of 0° After Top Dead Center (ATDC) to the piston's bottom most position at 180° ATDC of rotation.

The applied vertical force of the piston on the crankshaft of an IC engine (as a result of combustion pressure within the cylinder) can be written as:

$$\text{VerticalForce} = P(\theta) \cos \alpha \cdot A \qquad \text{Eqn. 1}$$

Where P(θ) is the combustion pressure, which is a function of crank angle (θ) (relative to Top Dead Center), A is the total projected surface area of the top of the piston generally perpendicular to the axis of travel 110, and α is the connecting rod angle (relative to the centerline of the cylinder). Note that in some engine designs the connecting rod may be connected to the piston via a piston pin (e.g., wrist pin) off axis from the centerline of the piston which typically affects the connecting rod angle. Piston pin offset can be a manufacturer's way of reducing stress on reciprocating parts as it permits these parts to be lighter, which can result in more efficient manufacture and less power loss in the engine, as well as higher rpm capabilities. A complementary result of piston pin offset can be reduced piston slap due to a more gradual shift from major to minor thrust during engine operation.

The moment arm (or torque arm) (e.g., provided as "m" in FIG. 1b) that generates the twisting force on the crankshaft varies as the crankshaft rotates. The moment arm (m) is the horizontal distance between the rotational axis (3) of the crankshaft main journal (which is typically positioned at the centerline 110 of the piston and/or cylinder) and the rotational axis (2) of the crank pin journal where the connecting rod is connected to the crankshaft. Therefore, the varying length of the moment arm can be written in terms of the rotational position of the crankshaft (e.g., crank angle θ) as:

$$\text{MomentArm} = r \sin \theta \quad \text{Eqn. 2}$$

Where r is the radial distance from the centerline (e.g. rotational axis) (3) of the crankshaft main journal to the centerline (e.g., rotational axis) (2) of the throw arm or crank pin for the connecting rod (i.e., where the connecting rod is connected to the crankshaft), therefore, $r \sin(\theta)$ is the length of the vertical force torque moment arm. Note that the maximum length of the varying torque moment arm occurs at a crank angle of 90 degrees and is equal to the crank radius.

Using the above definitions of the various connected pieces, the following equation can be written to represent the crankshaft torque (twisting force) (T) as a function of crank angle θ:

$$T(\theta) = \text{VerticalForce}(\theta) \cdot \text{MomentArm}(\theta) \quad \text{Eqn. 3}$$

After combining the above equations, the torque developed by a reciprocating engine during the power stroke can be represented as:

$$T(\theta) = P(\theta) \cos \alpha \cdot A \cdot r \sin(\theta) \quad \text{Eqn. 4}$$

As shown, this torque equation is heavily dependent on crank angle (θ). For a fixed engine design, A and r are constant and a is a function of the moment arm (i.e., $r \sin \theta$) and the connecting rod length (l). The connecting rod length (l) is equal to the distance between the rotational axis (1) of the wrist pin (which connects the connecting rod to the piston and the rotational axis (2) of the crank pin. Piston pressure P(θ) is also a very strong function of crank angle (θ) and is different for many combustion related factors (e.g., fuel-to-air ratio, compression ratio, fuel type, and other factors). Pressure P(θ) can also be different for IC engines vs. EC engines. The piston pressure can also vary with changes in engine rotational speed, which is commonly denoted in rotations per minute (RPM).

Figure 2:
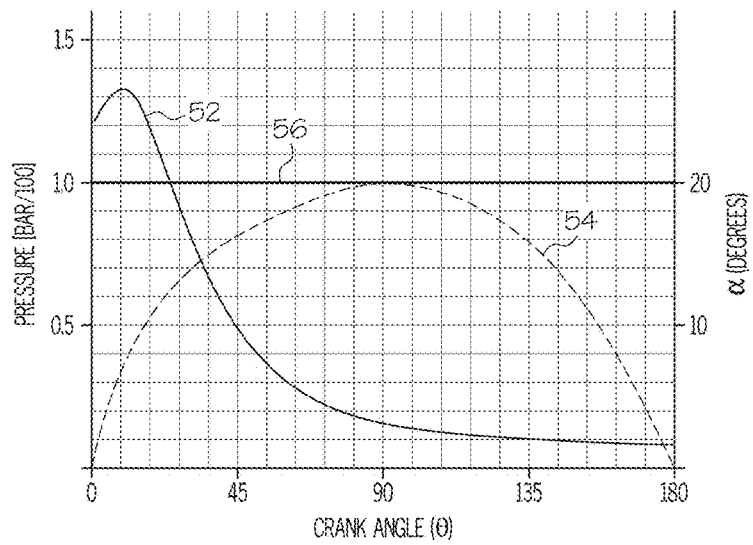
FIG. 2 is a plot of an example cylinder pressure curve of an internal combustion engine during a power stroke and corresponding moment arm lengths (e.g., a conventional moment arm and a constant moment arm) used to transfer the pressure into a driving torque.

In a typical IC engine, the pressure acting in the cylinder on the top of the piston (e.g., the piston pressure) peaks slightly after the crankshaft's Top Dead Center (TDC) position, at about 9° to 18° ATDC depending on the particular engine design, and can vary with engine rotational speed. For example, FIG. 2 depicts an example piston pressure 52 and moment arm length 54 of an example IC engine as a function of crank angle (θ). As shown, the piston pressure 52 reaches a maximum value several degrees after TDC and then decays fairly rapidly as the piston moves towards its bottom position at 180° ATDC. The moment arm length 54 function ($r \sin \theta$) starts at zero at 0° at TDC (as the connecting rod-to-crankshaft connecting point is directly above the crankshaft main journal rotational axis (e.g., centerline)), reaches a maximum at 90° (as the crank pin rotational axis is typically directly beside the crankshaft main journal rotational axis), and moves again to 0° at 180° (as the connecting rod-to-crankshaft connecting point returns to directly above the crankshaft centerline). As can be seen in this plot of FIG. 2, when the vertical force on the piston is at maximum, near the top of the stroke, the moment arm acting to rotate the crankshaft is very short. This varying moment arm impacts and limits the developed torque significantly.

Also illustrated in FIG. 2 is an example constant length moment arm 56 that would be seen if the output powertrain had a constant length moment arm as described herein having a length that is roughly the maximum length of the varying moment arm throughout the entire power stroke. As shown and discussed below, having such a constant length moment arm to generate torque (i.e., in particular during the maximum pressure within the cylinder) enables extraction of more output torque and power from the IC engine.

To demonstrate the impact of the constant length moment arm in relation to the varying moment arm on the engine output torque and horsepower, predicted power calculations for two cases for a typical IC engine can be calculated. The first case is for a varying moment arm (MomentArm=$r \sin \theta$) and the second case is for a constant length moment arm (MomentArm=m).

A simple comparison between the varying moment arm configuration and the constant moment arm configuration can be estimated by comparing the various equations described herein using equal corresponding values for both cases.

Figure 3:
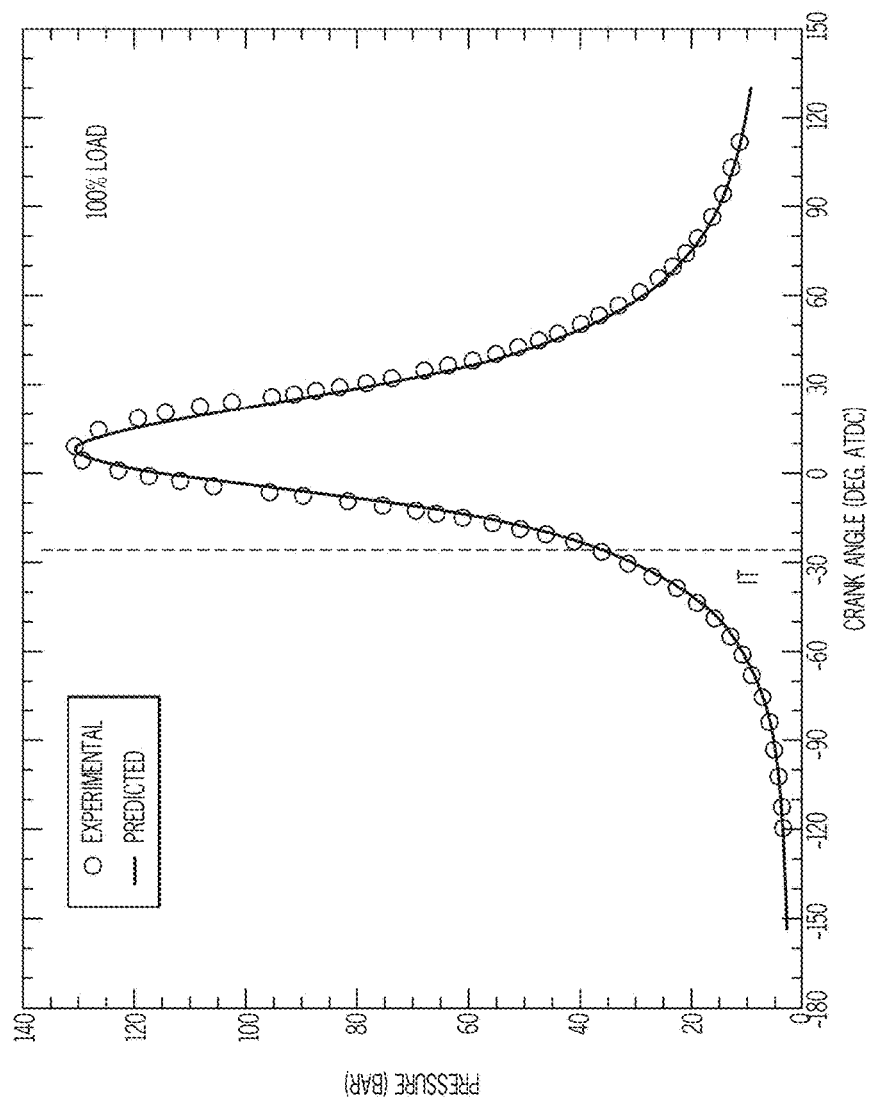
FIG. 3 is a plot of another example cylinder pressure curve of an internal combustion engine during a power stroke.

Using Equation 4 above with the example pressure curve illustrated in FIG. 3 (taken from Rakopoulos, C., Michos, C., and Giakoumis, E., *Availability analysis of a syngas fueled spark ignition engine using a multi-zone combustion model*, Energy, Volume 33, issue 9 (September 2008), p. 1378-1398, the contents of which is hereby incorporated by reference in their entirety), example torque values for the varying moment arm engine can be calculated at various crankshaft angles throughout the power stroke. For simplicity in comparing the torque values, the various parameters and dimensions were normalized using several unit-less values. In particular, an engine stroke (S) of 2; a piston area (A) of 3.14159; an engine bore (B) of 2; a crankshaft radius (r=S/2) of 1; a connecting rod length (L) of 2.924 were all used to simplify the calculations. Results of these example calculations are presented in the table of FIG. 4. As indicated, using these exemplary values, the typical IC engine was found to produce an average torque of about 0.122076.

For the constant length moment arm IC engine, as discussed above, the torque equation can be simplified to $T(\theta) = P(\theta) A \cdot m$, where P(θ) is the cylinder pressure based on the crank angle (e.g., as depicted in FIG. 3) and m is the length of the constant moment arm (e.g., the moment arm (m)=the radius (r) of the moment arm=S/2). Similar to the typical IC engine with a varying moment arm discussed above, estimated torque values can be calculated at various crankshaft angles throughout the power stroke using the same normalized dimensions as above. Results of these example calculations are presented in the table of FIG. 5. As indicated, using these exemplary values, the theoretical modified IC engine having a constant moment arm was found to produce an average torque of about 0.290584. Therefore, the average output for the IC engine having the constant moment arm is about 2.38 times that of the typical varying moment arm IC engine.

Figure 6:
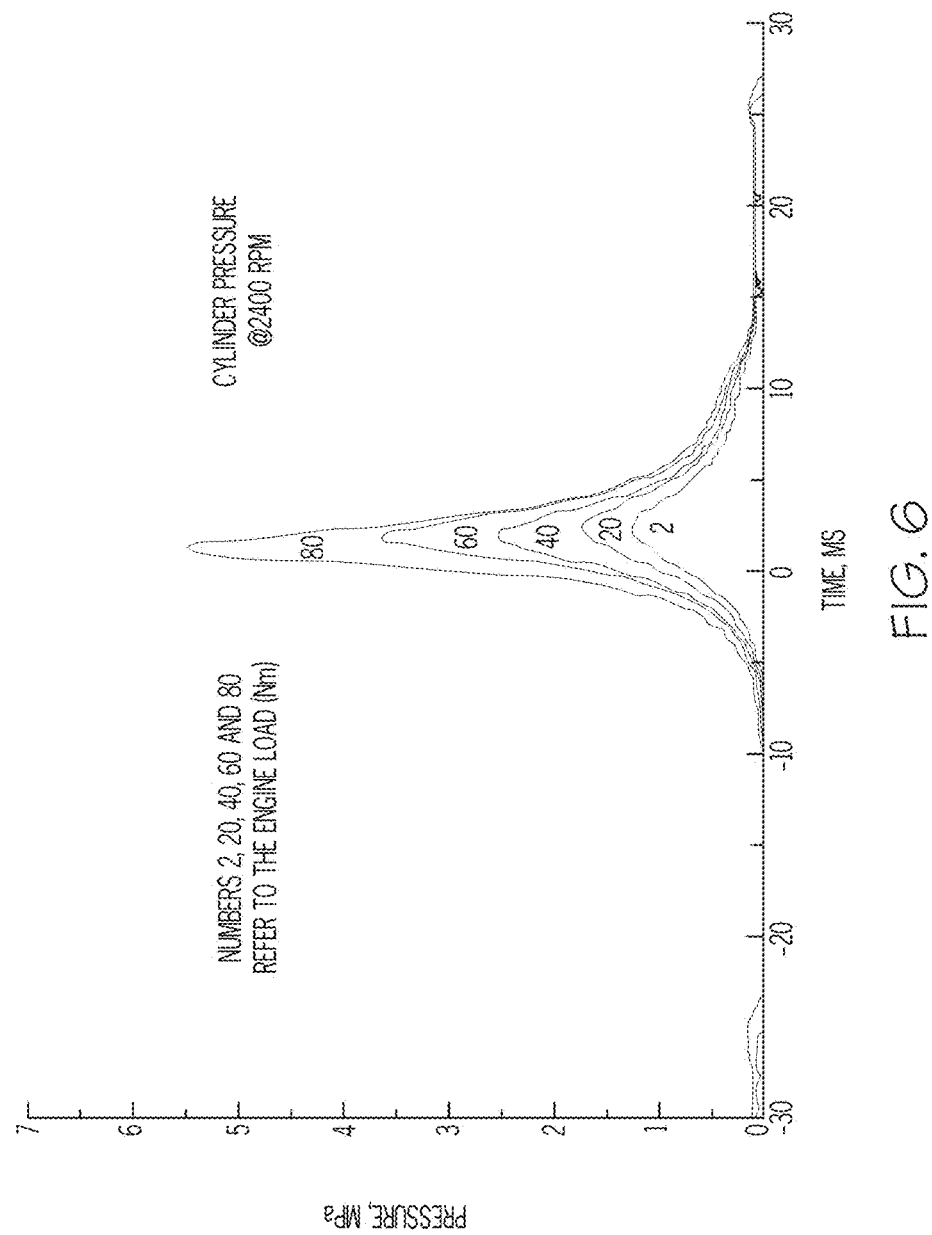
FIG. 6 is a plot of multiple example cylinder pressure curves within an internal combustion engine at several different engine loads during a power stroke.
Figure 7:
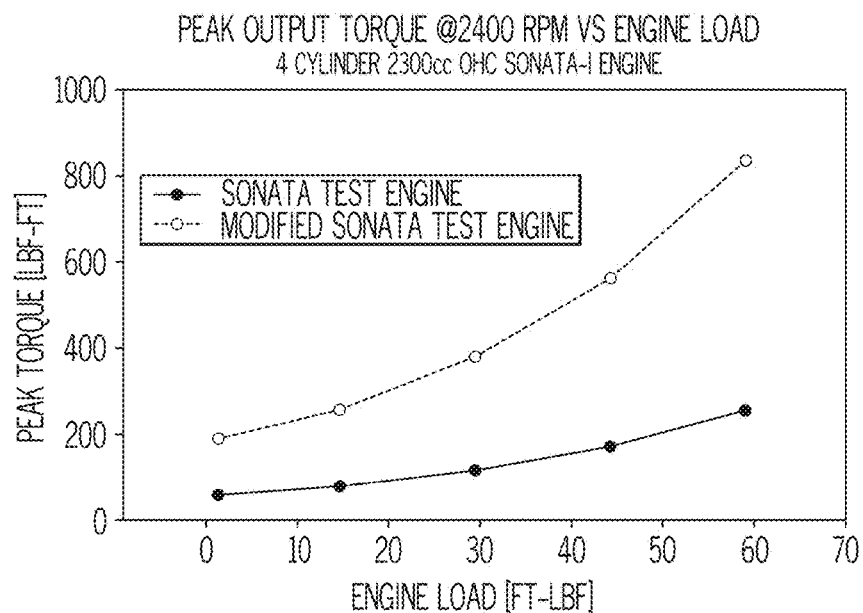
FIGS. 7-14 are plots that illustrate theoretical increased power and torque output using a power delivery device having a constant moment arm.
Figure 8:
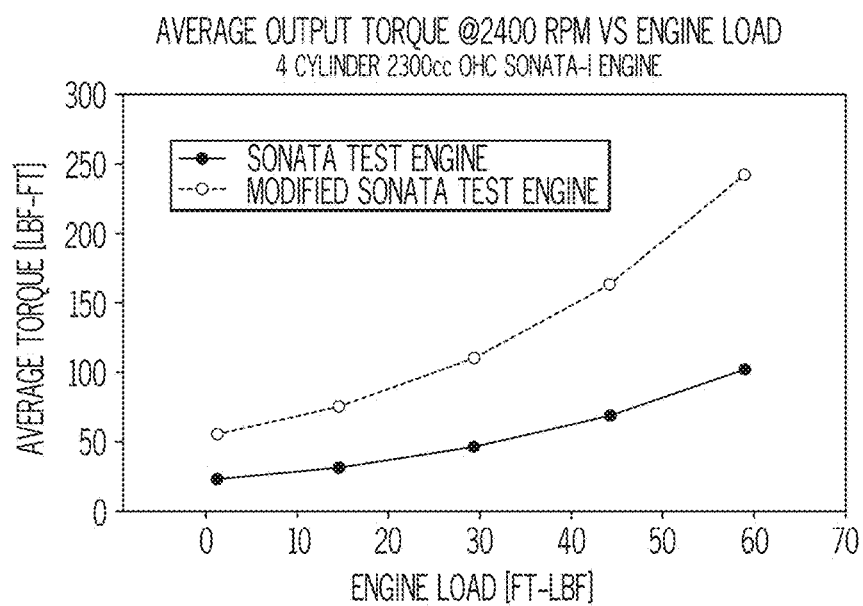
Figure 9:
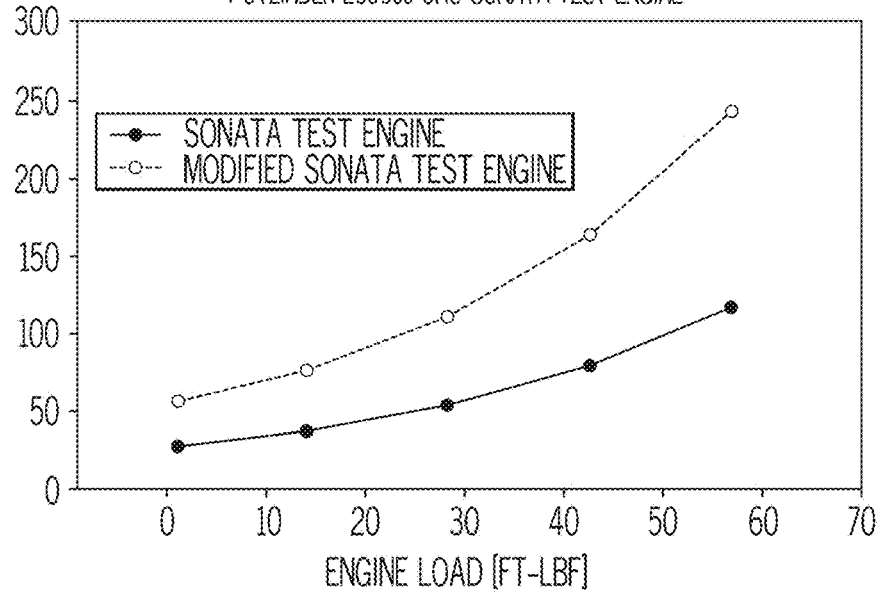
Figure 10:
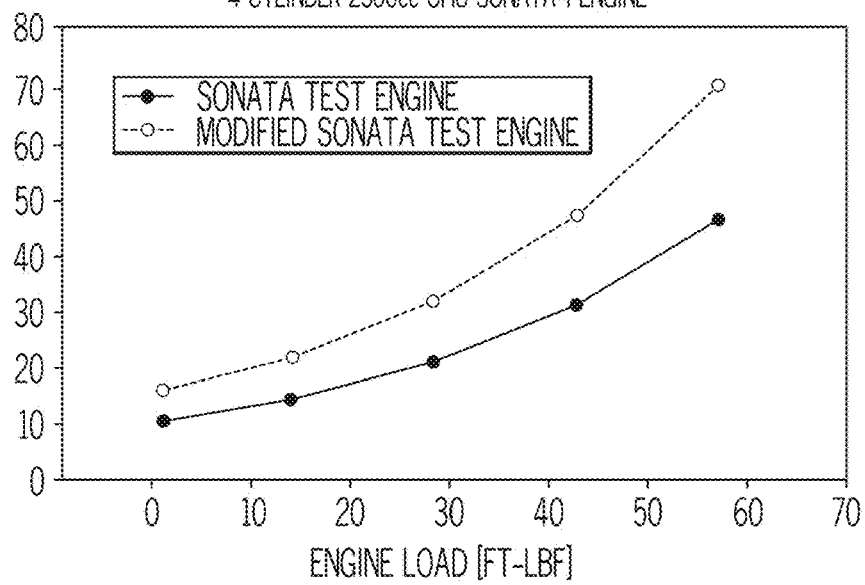
Figure 11:
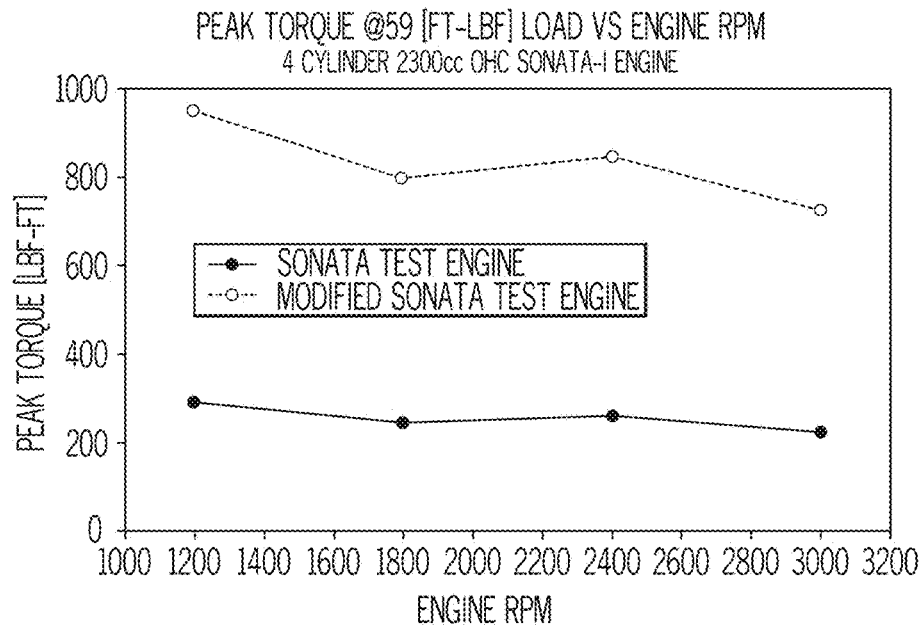
Figure 12:
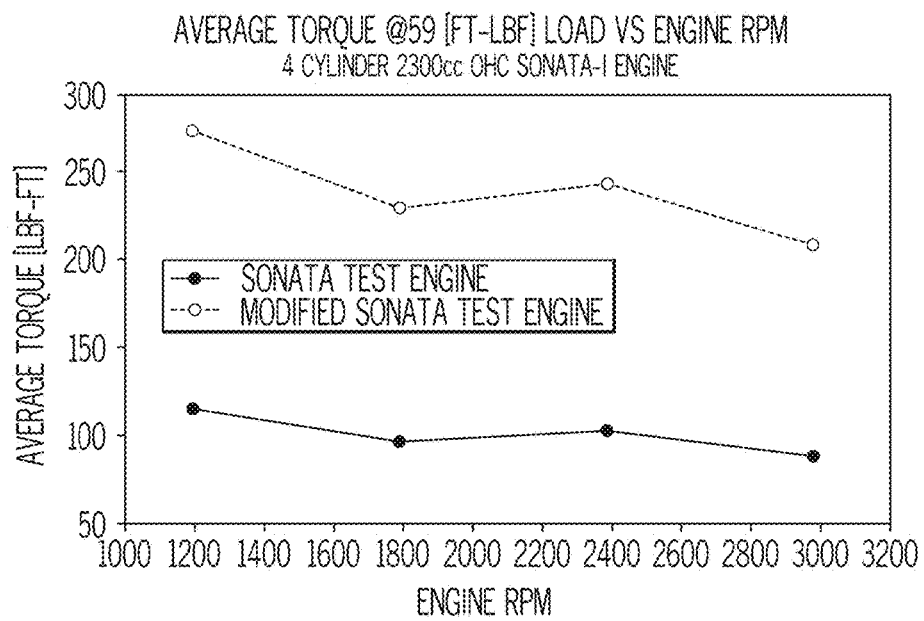
Figure 13:
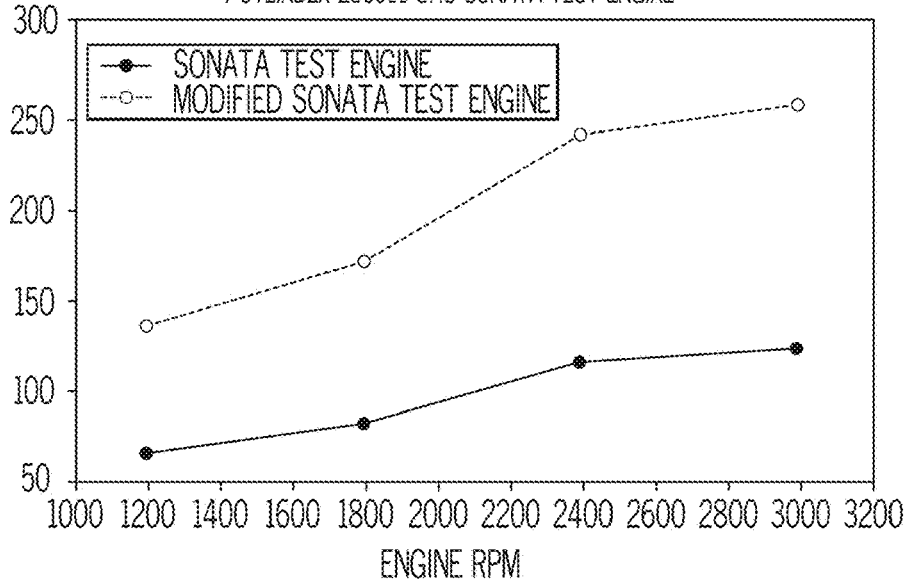
Figure 14:
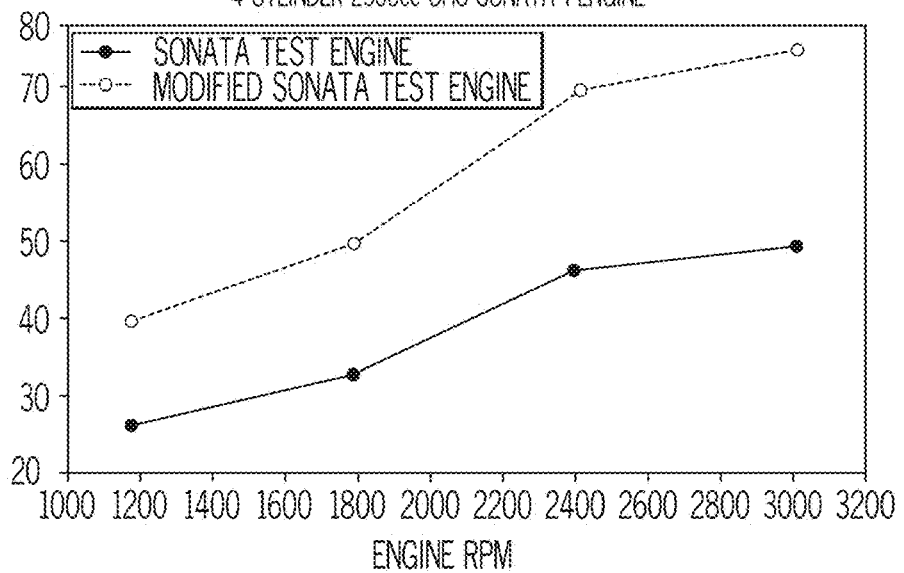

Additional calculations were also completed, which estimated the increased power and torque performance of the constant moment arm IC engine. For example purposes, the IC engine used for the calculations in both cases (e.g., a varying moment arm case and a constant moment arm case) is a Dual Over Head Cam (DOHC), 16 Valve, 4 cycle gasoline engine. In order to calculate predicted power and torque output for both cases, predetermined cylinder pressure curves for several different engine loads (as illustrated in FIG. 6) were taken and used in order to compare the varying moment arm and constant moment arm configurations using similar calculations to those used to prepare the torque tables of FIGS. 4 and 5. The pressure curves of FIG. 6 were taken from Martychenko, A., Park, J., Ko, Y., Balin, A., et al., *A Study on the Possibility of Estimation of In-Cylinder Pressure by Means of Measurement of Spark Gap Breakdown Voltage*, SAE Technical Paper 1999-01-1115 (1999), the contents of which is hereby incorporated by reference in their entirety. As detailed in Martychenko et al., the pressure curves are exemplary for a typical DOHC, 16 valve, 4 cylinder gas engine, so the calculations used to prepare torque and power estimates for the different engine loads were calculated using a piston bore (B) of 3.1693 inches and a piston stroke (S) of 3.1693 inches, which are typical examples for the type of DOHC, 16 valve, 4 cylinder gas engine detailed in Martychenko et al. (e.g., a 4 cylinder 2300 cc OHC Hyundai Sonata Engine). Torque and power output estimates were also calculated for a set engine load (e.g., 59 lbf-ft) across a range of engine speeds (i.e., rotational speed of the crankshaft).

Figure 15:
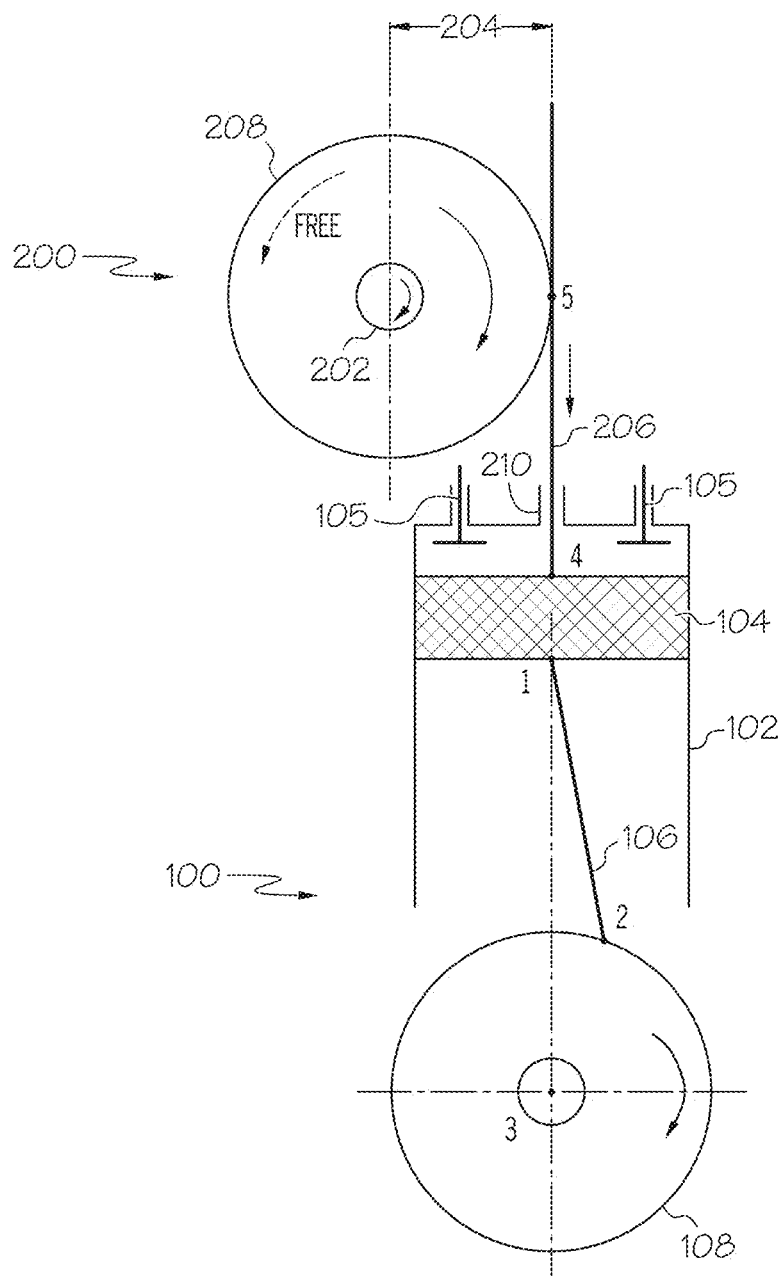
FIG. 15 is a schematic of an example reciprocating engine having a power delivery device having a constant moment arm to generate output torque.

To determine power output for the constant maximum length moment arm engine of this case where the moment arm (m)=crank radius (r)=½ the stroke (S/2), the reciprocating motion of the piston is converted into rotational motion of an output shaft. One exemplary general concept (e.g., implementation) that can be employed is depicted in FIG. 15. For each rotation of the crankshaft during which the connecting rod-to-crankshaft connecting point (2) (e.g., crank pin) travels π*S, the output shaft coupling point (5) (i.e., the point at which the pull rod, tension device, or similar component couples the piston to the clutch device (and therefore also to the output shaft)) only moves 2*S as the piston moves downward the distance of the stroke S and back upward the distance of the stroke S. While the examples herein are generally described as being only one cylinder for simplicity purposes, it is acknowledged that example engines having more than one cylinder will result the output shaft continuously rotating as each of the different pistons travel downward to generate motion of the output shaft. Thus, the rotational speed of the output shaft is proportionally lower than the rotational speed of the crankshaft. Therefore, to determine the steady state rotational speed of the output shaft for a consistent rotational speed of the crankshaft, the rotational speed of the crankshaft is multiplied by (2/π). It is noted that the piston momentarily stops moving in the vertical direction at both the top of the stroke (at top dead center (TDC)) and at the bottom of the stroke (at bottom dead center (BDC)) during the rotation of the crankshaft and quickly accelerates and decelerated between TDC and BDC as the crankshaft rotates. Therefore, the estimated speed of the output shaft can be equivalent (i.e., as influenced by the length of the moment arm (e.g., distance from the center of the output shaft to where the pull rod, tension device, or similar component is coupled to the clutch device)) to the average speed of the piston as it starts from 0 at TDC, accelerates to a maximum speed and then decelerates to 0 at BDC. As discussed above, the output shaft can typically continue to rotate when the piston moves upward from BDC to TDC. Therefore, while the piston moves upward (in an opposite direction of the rotation of the output shaft), the output shaft can continue to rotate, for example, at a speed that can be estimated using the average speed of the piston as it travels upward from BDC to TDC. That is, while the piston may reciprocate in two opposite directions, the speed of the output shaft can be estimated based on absolute average speed of the piston as it moves between BDC and TDC.

Further, in engines having only one cylinder, it is expected that devices, such as flywheel devices, can be used to maintain a portion of the rotational speed of the output shaft while the piston moves upward (i.e., and the movement of the piston is not directly applying rotational force to the output shaft).

The results of these calculations are illustrated in the plots of FIGS. 7-14. As illustrated, the estimated torque and power increases observed for the constant maximum length moment arm engine are generally proportionally larger for all of the calculated values. As discussed above, the rotational speed of the output shaft and the crankshaft are not generally the same, and the rotational speed listed in FIGS. 7-14 (e.g., 2400 RPM) is the rotational speed of the crankshaft (i.e., not necessarily the rotational speed of the output shaft).

In addition to the potential increases in torque and power discussed above, it is expected that the power delivery devices described herein having a constant maximum length moment arm can also be used to store energy (e.g., power) to be used when the engine is decelerating. For example, as detailed herein, a power delivery device can include an output shaft coupled to a reciprocating engine (i.e., reciprocating pistons of the engine) by a clutch device (e.g., a one way clutch) that permits the output shaft to rotate freely in one direction. That is, the clutch device can engage the output shaft only when the piston is in a downward motion. As mentioned above, this configuration helps permit the output shaft to rotate at different speeds than the crankshaft of the reciprocating engine to which the power delivery device is coupled.

In some aspects, the ability to rotate the output shaft at different speeds than the crankshaft enables the power delivery device to serve as a power storage device. For example, during use, the rotational speed of the crankshaft can be reduced by a user (e.g., as a result of engine deceleration) which would typically result in a reduction in power based on the reduced rotational speed. However, since the output shaft is typically able to rotate in one direction freely from the crankshaft, the output shaft need not decelerate when the crankshaft decelerates. Therefore, when the crankshaft decelerates, for example when the user decelerates the engines during use, the output shaft can be permitted to continue rotating at a higher rotational speed to continue generating power. As discussed below, the output shaft can include a flywheel that is useful to generate and maintain rotational momentum and motion of the output shaft.

In some cases, this configuration can be used in order to store or recapture energy during engine deceleration. For example, in some embodiments in which the reciprocating engine and power delivery device are used in an automobile, during deceleration of the crankshaft (e.g., as a result of letting off the accelerator pedal), the output shaft can continue to rotate to produce power (e.g., electrical or mechanical power) for use in other systems. Therefore, in some embodiments, devices including one or more of the power delivery devices described herein can be used as hybrid devices that can utilize both the power generated as a result of the reciprocating engine mechanically coupling and rotating the output shaft during a power stroke of the engine, as well as the stored energy (e.g., power) that can be made available by the continued rotation of the output shaft even when the engine decelerates or stops.

Additionally, in some embodiments, the output shaft can be connected to a coupling or a component of an automatic transmission (e.g., a torque converter of a transmission) so that the continued and consistent rotation of the output shaft (e.g., after the crankshaft has decelerated abruptly) can help provide consistent rotational speed and power to the automatic transmission. As mentioned above, such a coupling (e.g., a torque converter) can also be used to reduce the effects of the pulsing motion of the output shaft, which can result from the reciprocating motion of the piston that drives the clutch device.

Reciprocating Engine Having Constant Moment Arm

As discussed above, it is theoretically possible to extract more (e.g., significantly more) rotational kinetic power from the power stroke of a reciprocating piston by using a rotating powertrain (e.g., power delivery device) that is connected to the reciprocating pistons via a torque moment arm having a substantially consistent (e.g., constant) length (e.g., constant maximum length) throughout the power stroke. In some embodiments, a substantially consistent length torque moment arm can include a torque moment arm that is fixed at a set length which is its maximum length and allowed to vary only slightly from that fixed maximum value (e.g., constant, or invariant, or consistent). In some cases, the substantially consistent length moment arm can vary (e.g., slightly) as a result of contact regions moving along interfacing gears or between interfacing sprockets and chains.

For example, referring to FIG. 15, an example reciprocating engine 100 having a reciprocating element (e.g., a piston 104) connected to a rotatable crankshaft 108 via a connecting rod 106 and configured to translate up and down within a cylinder 102 and valves (e.g., intake and exhaust valves) 105 that control gas entering and exiting the cylinder 102. The engine 100 can be connected to a power delivery device 200 having a separate power output element (e.g., power output shaft 202) that is rotatably coupled to the piston 104 via the power delivery device 200 having constant length moment arm 204. The power output shaft 202 can be coupled to any of various devices that can utilize the rotational power including automotive drivetrains (e.g., drivetrains for cars, trucks, motorcycles, construction equipment (e.g., bulldozers) or other transportation devices, such as airplanes or boats), generators, welders, or other devices utilizing rotational power.

As illustrated, the power delivery device 200 can include an elongated translating tension device (e.g., a pull rod) 206 connected to the piston 104 such that as the piston 104 moves back and forth within the cylinder (e.g., up and down when the cylinder is vertically oriented, as shown in the example of FIG. 15), the pull rod 206 moves in the substantially same manner as the piston 104 (e.g., substantially the same travel distance, speed, acceleration, and produces substantially the same available axial force (e.g., force available to do external work) as the piston). The pull rod 206 could be connected at any desired location on the piston 104. That is, the pull rod could be secured to a region of the piston or connected to the wrist pin connecting the piston to the connecting rod. The pull rod 206 is typically configured to interface with other components of the power delivery device 200 that are attached to or integrated within the power output shaft 202. For example, in some examples as described below, the pull rod 206 can include a toothed rack (e.g., an elongated member having one or more rows of gear teeth) that is configured to interface and engage (5) with a rotatable member 208, such as a substantially round member (e.g., a gear device) of the power delivery device that is coupled to the output shaft 202. The portion of the engine that defines an opening 210 through which the pull rod 206 passes (e.g., pull rod opening) into cylinder (e.g., a cylinder head) typically includes a sealing device in order to limit (e.g., prevent) gas flow and pressure loss through an area between the opening and the pull rod.

Figure 16:
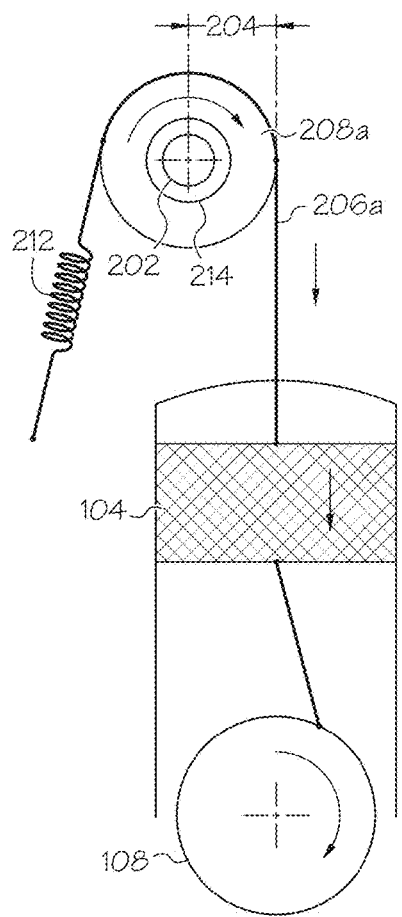
FIG. 16 is a side cross-sectional view another example reciprocating engine having a power delivery device having a flexible tension device (e.g., a cable) that is connected to a piston to generate power.
Figure 17:
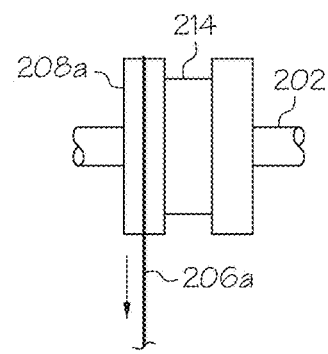
FIG. 17 is a front view of the power output delivery device of FIG. 16.
Figure 18:
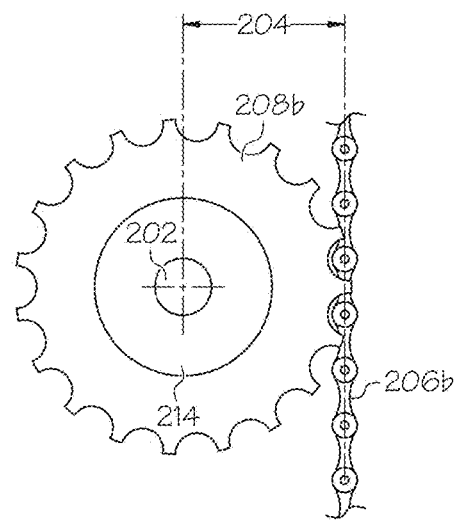
FIG. 18 is a side view of a power delivery device having a chain and sprocket system coupled to a power output shaft.

While the power delivery device that transfers the linear motion of the piston into the rotational motion of the power delivery device is generally described and illustrated as a single toothed rack that interfaces and engages with a gear device coupled to the output shaft, other configurations are possible. For example, in some embodiments, the power delivery device can include one or more additional gear sets used to increase or decrease rotational speed or torque of the output shaft based on the linear speed and force of the reciprocating piston. Additionally or alternatively, the power delivery device can include any of various devices or systems that can suitably transfer the linear motion of the piston into rotational motion of the output shaft while maintaining a substantially consistent (e.g., constant) length moment arm. For example, in some embodiments, the power delivery device (e.g., the rotatable member of the power delivery device) can additionally or alternatively include a belt system, a pulley system, and/or a chain drive system. In some cases, referring to FIGS. 16-18, one end of a tension device (e.g., a belt, cable 206a, chain 206b, or other device able to apply a tensile force) can be attached to a piston and the other end of the tension device can be connected to an output shaft using a pulley 208a or a sprocket 208b. A spring return mechanism 212 can also be included to help return the tension device (e.g., cable 206a, belt or chain 206b) upward as the piston 104 moves to the top of the stroke. In some embodiments, a power delivery device can include other types of power transfer systems including any of various devices.

Since the motion of the piston 104 alternates back and forth but it is generally desired to only rotate the output shaft 202 in one direction, the power delivery device 200 (e.g., the rotatable member 208 in some cases) is typically configured to engage the output shaft substantially in one direction (e.g., for a two cycle IC engine, only during the power stroke when the piston is moving downwardly as a result of the pressure increase caused by combustion within the cylinder) so that the output shaft only rotates in one direction. Note: for a four cycle engine, a clutch bearing power delivery device would be engaged both during an intake down stroke and a power down stroke but would still only allow rotation in one consistent direction.

In some embodiments, the power delivery device (e.g., the rotatable member of the power delivery device) is configured to grip the output shaft only when the tension device (e.g., pull rod, cable, or sprocket) is pulled into the cylinder by the piston and then substantially release the output shaft when the pull rod moves out of the cylinder as the piston returns to top dead center. In some embodiments, the power delivery device 200 includes a clutch device 214, such as a one-way clutch, that is configured to engage and rotate the output shaft only when the tension device moves into the cylinder but permits a rotating component of the power delivery device (e.g., the round gear device) to rotate freely relative to the output shaft in the opposite direction when the pull rod moves out of the cylinder to limit (e.g., prevent) the output shaft from inadvertently being alternatively rotated in a back and forth manner as the reciprocating piston moves within the cylinder. In some embodiments, the rotatable member can include a sprocket, a gear, a pulley, a wheel, a clutch device, or any suitable combination of one or more devices.

In some examples, as further discussed below, the clutch device 214 comprises a one-way freewheel clutch, a bearing clutch, such as a sprag clutch (e.g., a CSK model one-way bearing), or other similarly suitable one-way clutch devices. Clutch bearings can function as simple ball or roller bearings when rotated in one direction, and limit (e.g., prevent) rotation when turned in the opposite direction. This is sometimes accomplished by using spring-loaded sprags, which act as a wedge between the two bearing races. Clutch bearings are variously known as CSK bearings, one-way bearings, single direction bearings, and sprag bearings. The one-way clutch device can be spring-loaded to limit backlash as the output shaft is engaged. Alternatively or additionally, the clutch device can include a ratcheting mechanism, such as a ratchet clutch that enables the output shaft to be engaged substantially only when the power delivery device attempts to rotate the output shaft in one direction.

As illustrated, as a result of the interface between pull rod and the power delivery device being a generally consistent distance away from the rotational axis of the output shaft with respect to the axis of motion of the reciprocating piston (i.e., unlike the connection between the connecting rod and the crankshaft, as discussed above), the moment arm of the force that generates torque acting on the output shaft is substantially constant, steady or invariant.

As discussed above, this substantially consistent (e.g., substantially constant) length moment arm permits the extraction of increased (e.g., substantially increased) torque and power output via the output shaft driven by the pull rod than would otherwise be possible by extracting power from the crankshaft.

As a result of the substantially constant moment arm extraction of developed torque from the reciprocating engine, it is expected that the engine will convert the explosive energy of combustion into mechanical rotational motion more easily and that engine heat loses will be reduced and that the engine's overall thermal efficiency will be increased.

While the reciprocating piston engine illustrated still typically includes a crankshaft and connecting rods, which are used at least for returning the piston back to top dead center after the power stroke, it is expected that in some cases both the crankshaft and connecting rod can be reduced in size and structural integrity because these components are no longer used for transferring useable torque and power from the engine. Such a reduction in size of the crankshaft and connecting rod may be expected to help reduce the amount of parasitic power loss that could otherwise result from the additional rotating mass in the engine.

The example reciprocating engine illustrated in the schematic of FIG. 15 can be carried out in any of various suitable configurations and designs. As mentioned above, an engine (e.g., an IC engine) can be designed specifically to include the separate power delivery device and power output shaft by which the power generated by the reciprocating pistons can be extracted. Such specially designed engines can include reduced crankshafts and connecting rods in order to limit power loss that could result from the rotating mass.

Example Implementations

In some embodiments, an existing engine (e.g., an existing IC engine) can be modified to include a separate power delivery device and power output shaft by which the power generated by the reciprocating pistons can be extracted. For example, FIGS. 19-23 illustrate a modified four cylinder engine 300, which is modified to include the separate power delivery device 400 and power output shaft 402. It is noted that the crankshaft, connecting rods, several gas seals, and other parts of the engine are omitted from the figures for clarity.

As illustrated, the modified IC engine is a dual-over-head-cam (DOHC) four cylinder, four cycle, In-Line gasoline powered engine (e.g., a modified Toyota Model 3RZ-FE gasoline engine). For multiple cylinder reciprocating engines (e.g., IC engines) it is generally desirable to have a single power output shaft, therefore a simple expected configuration includes one where the pistons and cylinders are in line with one another so that the power delivery device of each piston and cylinder can be configured to a single power output shaft. For the four cycle IC engine there is one power stroke every two revolutions of the crankshaft. Therefore, for the four cylinder four cycle IC engine there is a power stroke every 180 degrees rotation of the crankshaft. For a six cylinder IC Engine there is a power stroke every 120 degrees of crankshaft rotation and for an eight cylinder IC engine every 90 degrees of rotation. A single power output shaft of the above described In-Line IC engines, whether 4, 6, or 8 cylinders, is desirable. Although it may be desirable to have a single power output shaft, all of the benefits of increased torque and power of this constant torque arm invention apply to reciprocating engines of all power cycles and all mechanical configurations (e.g., V6, V8, V12, Radial, etc.). In mechanical configurations of multiple cylinder engines that are not 'in-line' there may be multiple power output shafts. Additionally, in some embodiments, V-style engine configurations can be coupled to a power delivery device having a single output shaft. That is, even in the case of engines having pistons and cylinders that are not all in-line with one another, tension devices connected to the pistons can be coupled to a common output shaft using any of various gearing or pulley configurations to cause consistent rotation of the output shaft.

In a DOHC In-Line IC engine the area above the piston and cylinder centerline is more or less unobstructed with various engine parts, making it easier for the addition of a power delivery device which is attached to the piston and travels up through the cylinder head. As illustrated, the power delivery device 400 can include two pull rods 406 for each cylinder that are coupled to a piston (e.g., via the existing piston pin used to couple the piston to the connecting rod). In the example shown, two pull rods 406 are used (e.g., one on each opposite side of the piston) in order to balance the load on the piston 304 and may also reduce the load exerted on each pull rod 406. In some IC engine designs, the connecting rod is connected to the piston slightly off-axis of the piston centerline. The pull rods 406 are disposed through an opening 410 on a component of the engine (e.g., the cylinder head 302) and are configured to move up and down through the opening 410 with the motion of the piston. Note that in the example four cylinder, four cycle reciprocating engine shown in FIG. 19-22, two of the pistons can be configured to move in the same direction at all times, exactly 180 degrees apart from the other two pistons. As one cylinder fires in a power stroke, driving that piston downwardly into the cylinder, all four pull rods of the two pistons moving together will share the driving load of the power stroke.

Figure 19:
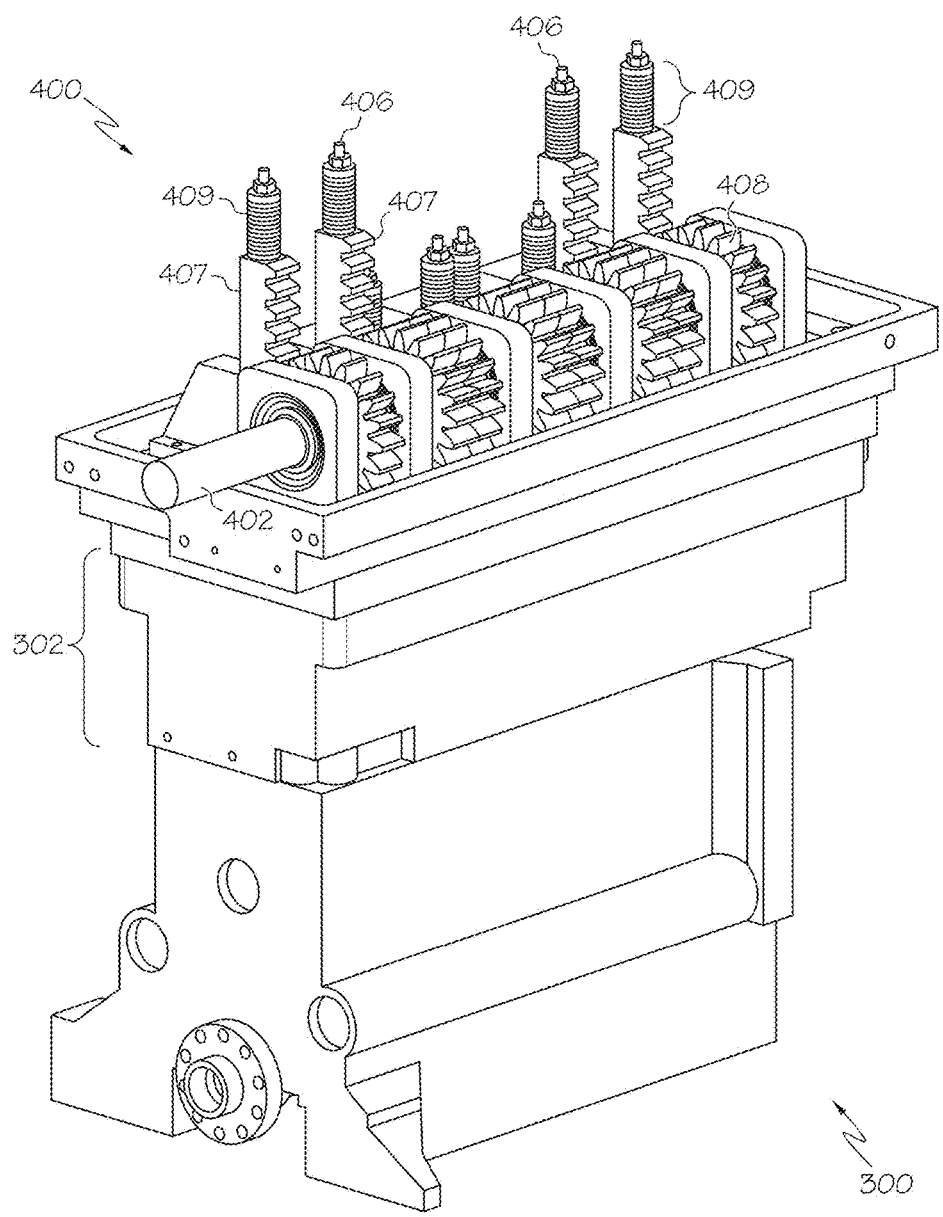
FIG. 19 is a perspective view of another example of a power delivery device that generates output torque using a constant moment arm mounted onto a reciprocating piston engine.
Figure 20:
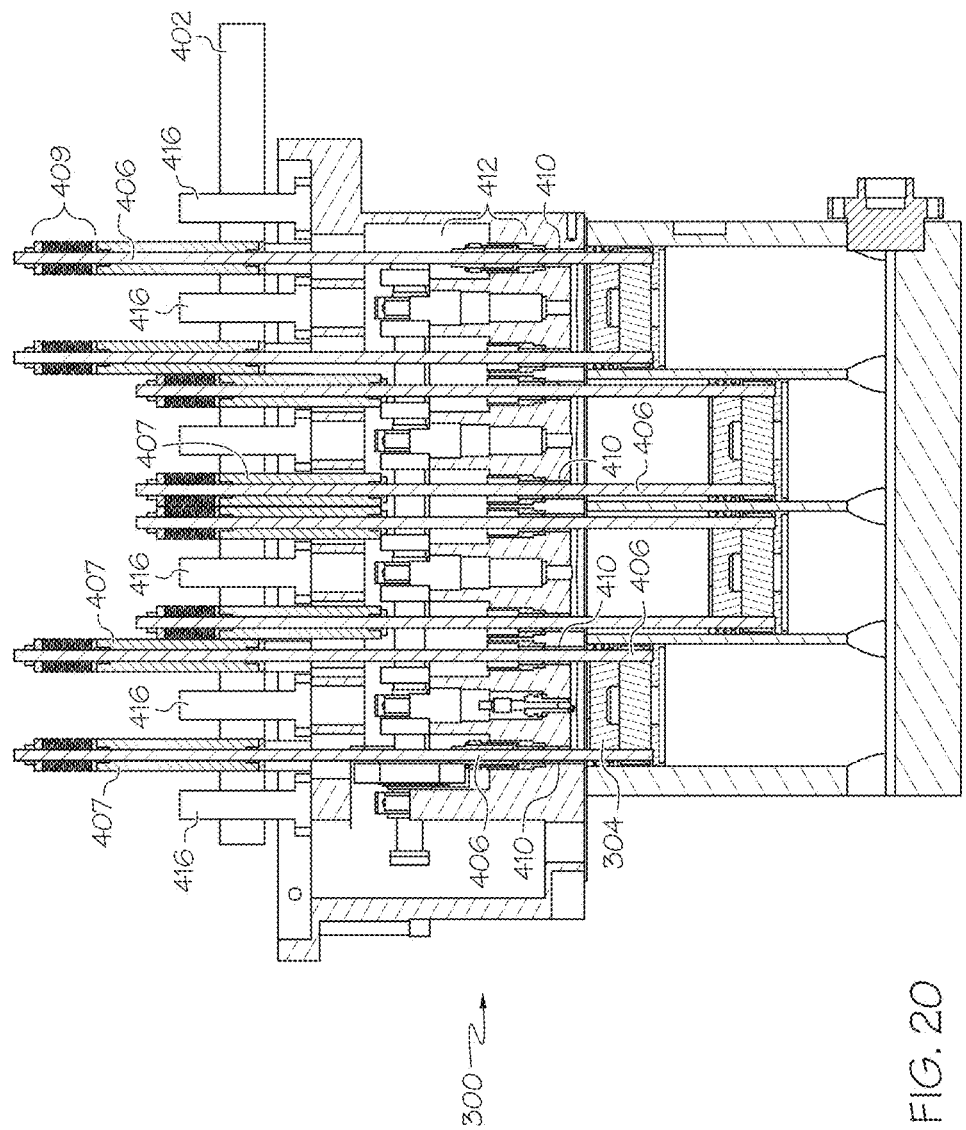
FIG. 20 is a cross-sectional front view of the power delivery device and reciprocating piston engine of FIG. 19.
Figure 21:
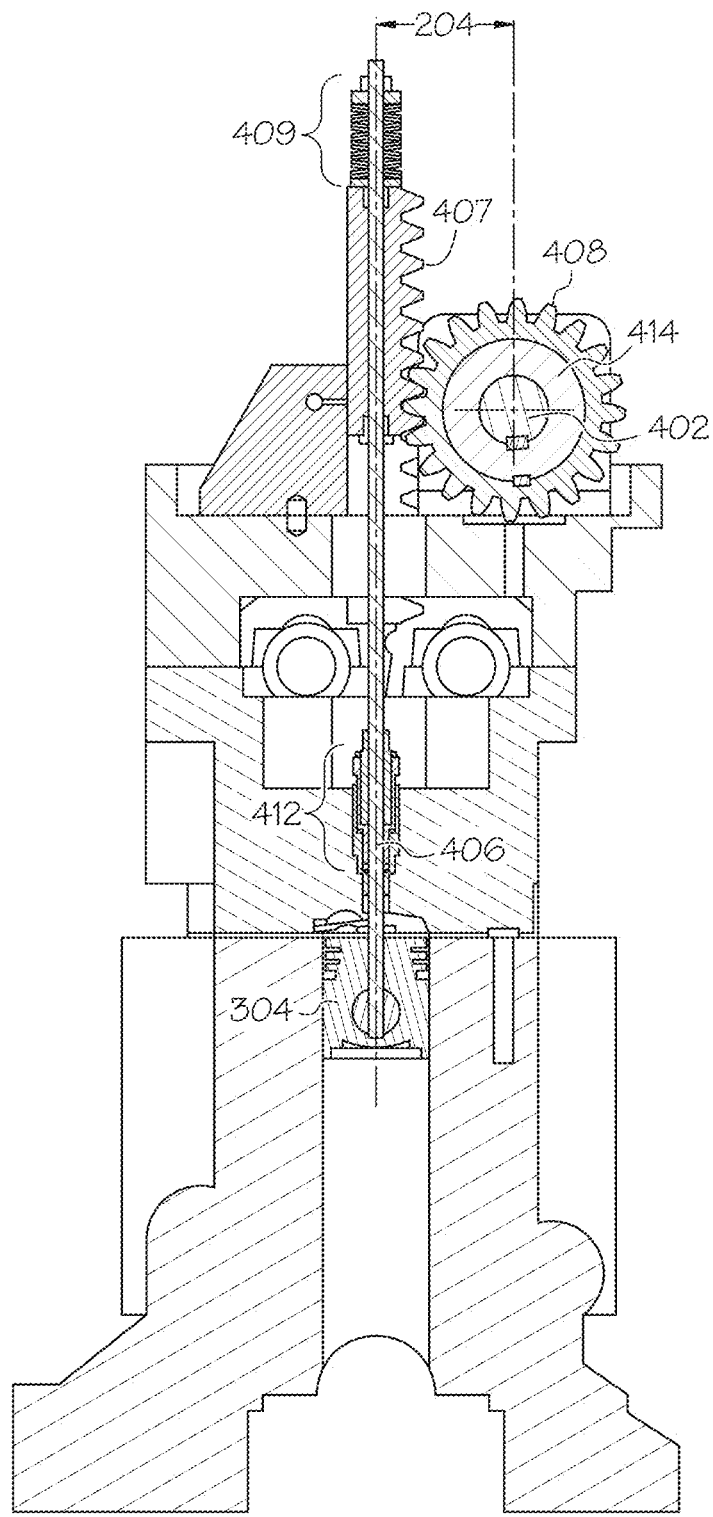
FIG. 21 is a cross-sectional side view of the power delivery device and reciprocating piston engine of FIG. 19 illustrating a seal assembly to limit pressure loss from the engine cylinder and an energy storage device coupled between a pull rod and a gear rack of the power delivery device.
Figure 22:
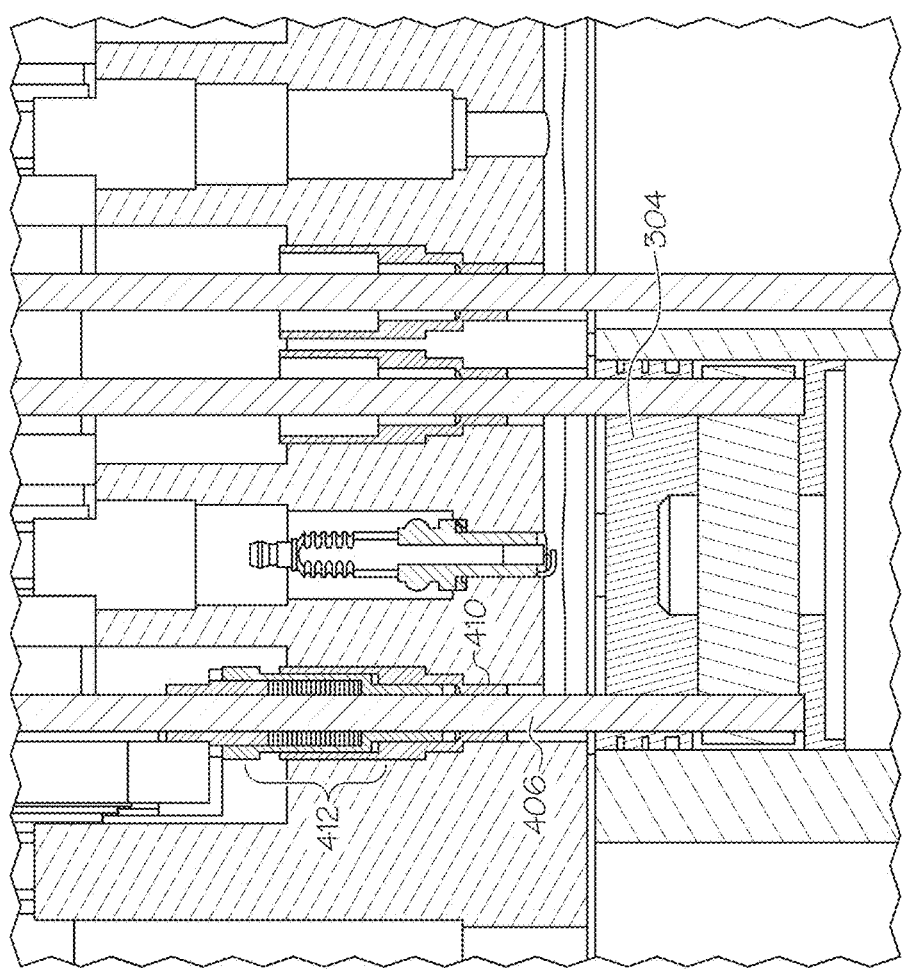
FIG. 22 is an enlarged cross-sectional view of the engine of FIG. 19 illustrating pull rods of the power delivery device coupled to a reciprocating piston.
Figure 23:
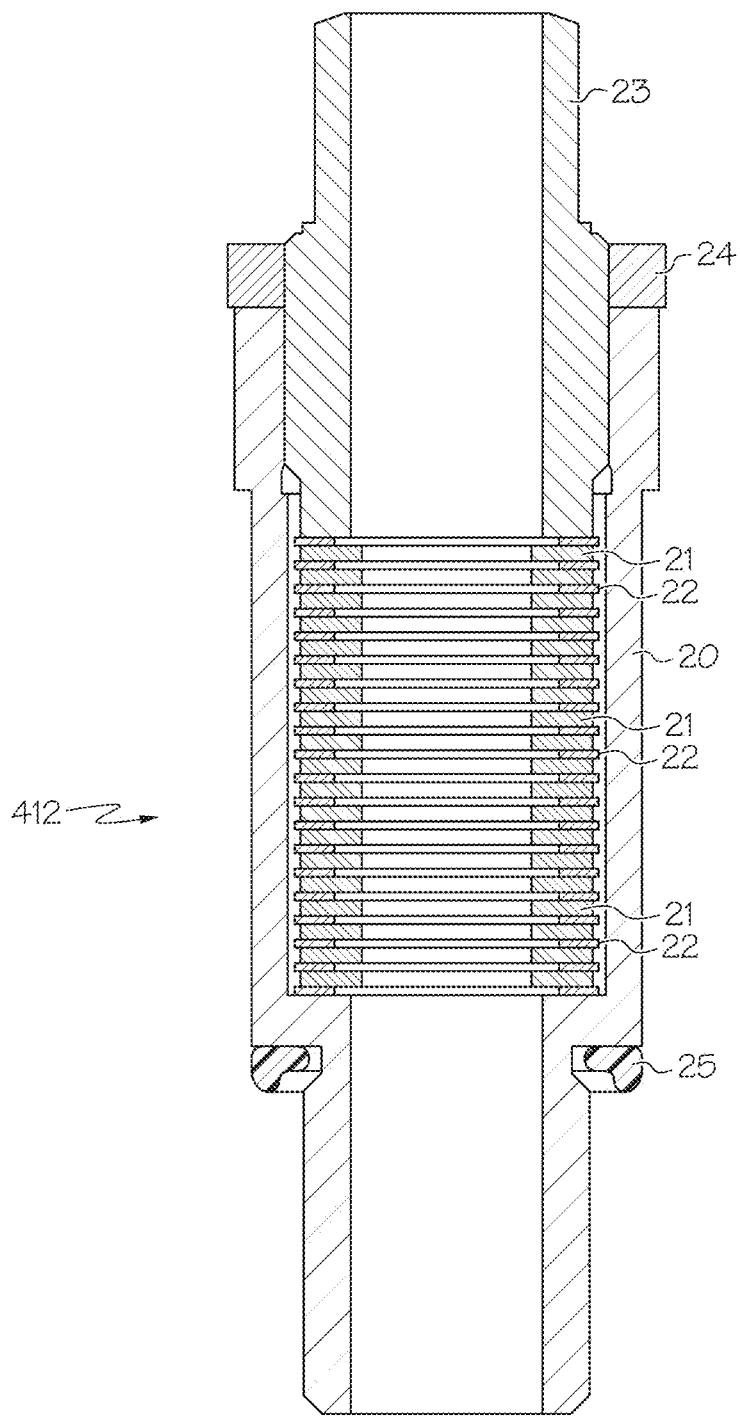
FIG. 23 is a cross-sectional view of a sealing device that can be used to limit gas pressure loss from a combustion chamber.

In some embodiments, the pull rods 406 include a toothed gear rack 407 that is coupled to an upper region of the pull rod. In some embodiments, the gear rack 407 can be coupled to the pull rod 406 so that the gear rack 407 can move slightly along, and independently to, the pull rod. In some cases, as illustrated, the gear rack can be attached to the pull rod using one or more spring elements (e.g., Belleville style springs) 409, which can help perform several functions. For example, the springs can act as an energy storage device 409 for the power delivery device. As discussed above and illustrated in FIG. 2, the pressure within the cylinder (and therefore also the force acting on the piston) typically has a distinct spike very early during the power stroke and then quickly decays as the piston travels into the cylinder. Therefore, the springs that couple the gear racks to the pull rods as illustrated in FIGS. 19-21 can compress to absorb a portion of the initial load as the pressure spikes (which would cause the pull rods to move downward slightly relative to the gear racks), storing energy in the compression of the springs. Then, as the piston moves into the cylinder and the pressure decays, the spring can expand to force the gear rack back down against the pull rod, releasing the stored energy. Such compression and expansion of the spring can help to distribute the force spike seen by the piston near Top Dead Center. Figuratively, this can act to slightly smooth the pressure curve and distribute some of the forces throughout the piston power stroke. Additionally or alternatively, the springs can also help limit shock that could be generated as the reciprocating piston translates back and forth.

Alternatively, the gear rack can be permanently fixed to the pull rod (e.g., via fasteners or by being integrally formed into the pull rod). The gear rack is sized and configured to engage and couple to a rotating member (e.g., a substantially round gear 408), which is coupled to the output shaft 402 in order to rotate the output shaft. As discussed above, the toothed gear 408 is typically coupled to the output shaft 402 using a clutch (e.g., a one-way clutch bearing 414) in order to transfer the reciprocating linear motion of the pull rods into a substantially one-way only rotational motion.

As shown, in some embodiments, the output shaft is coupled to the engine (e.g., the cylinder head) using mounting devices (e.g., bearing carriers 416) that position the output shaft but permit it to rotate under torque generated by the power delivery device.

Referring specifically to FIGS. 20-23, the cylinder head 302 includes a sealing member (e.g., a seal, such as a labyrinth seal) 412 that is able to limit pressure loss through the opening 410 through which the pull rod 406 travels while providing an adequate clearance so that the pull rod 406 can move freely through the sealing member 412. As illustrated in the enlarged view of FIG. 23, the labyrinth seal assembly 412 includes a generally cylindrical main body 20 housing a series of sealing disks 21 that are separated from one another by disk spacers 22. The labyrinth seal assembly 412 also includes a clamping plug 23 to retain the sealing disks 21 and the disk spacers 22 within the main body 20. A jam nut 24 can be used to couple the clamping plug 23 to the main body 20. A cylinder gasket 25 can be positioned at an end of the seal assembly 412 (e.g., at an end configured to be inserted into the engine cylinder) to help seal the cylinder.

The inner diameter of the sealing disks 21 can be configured to be only slightly larger than the pull rod diameter. The inner diameter of the disk spacers 22 can be larger than the inner diameter of the sealing disks 21 by several multiples of the gap distance between the pull rods and seal disk inner diameter to create a cavity between sealing disks. The series of created cavities between sealing disks 21 can create a large resistance to gas flow where the more cavities formed can increase resistance to flow. The disk spacers 22 can be made somewhat compliant to compensate for a tendency of the seal to become loose. Alternatively, a separate compliant part (e.g., a spring) could be added to the stack.

While some example power delivery mechanisms have been described herein and illustrated in the accompanying figures, other example devices can be used to convert the reciprocating motion of a piston into a rotational motion of an output shaft. In some case, mechanisms described herein can be used in addition or alternatively to a typical engine crankshaft.

Figure 24:
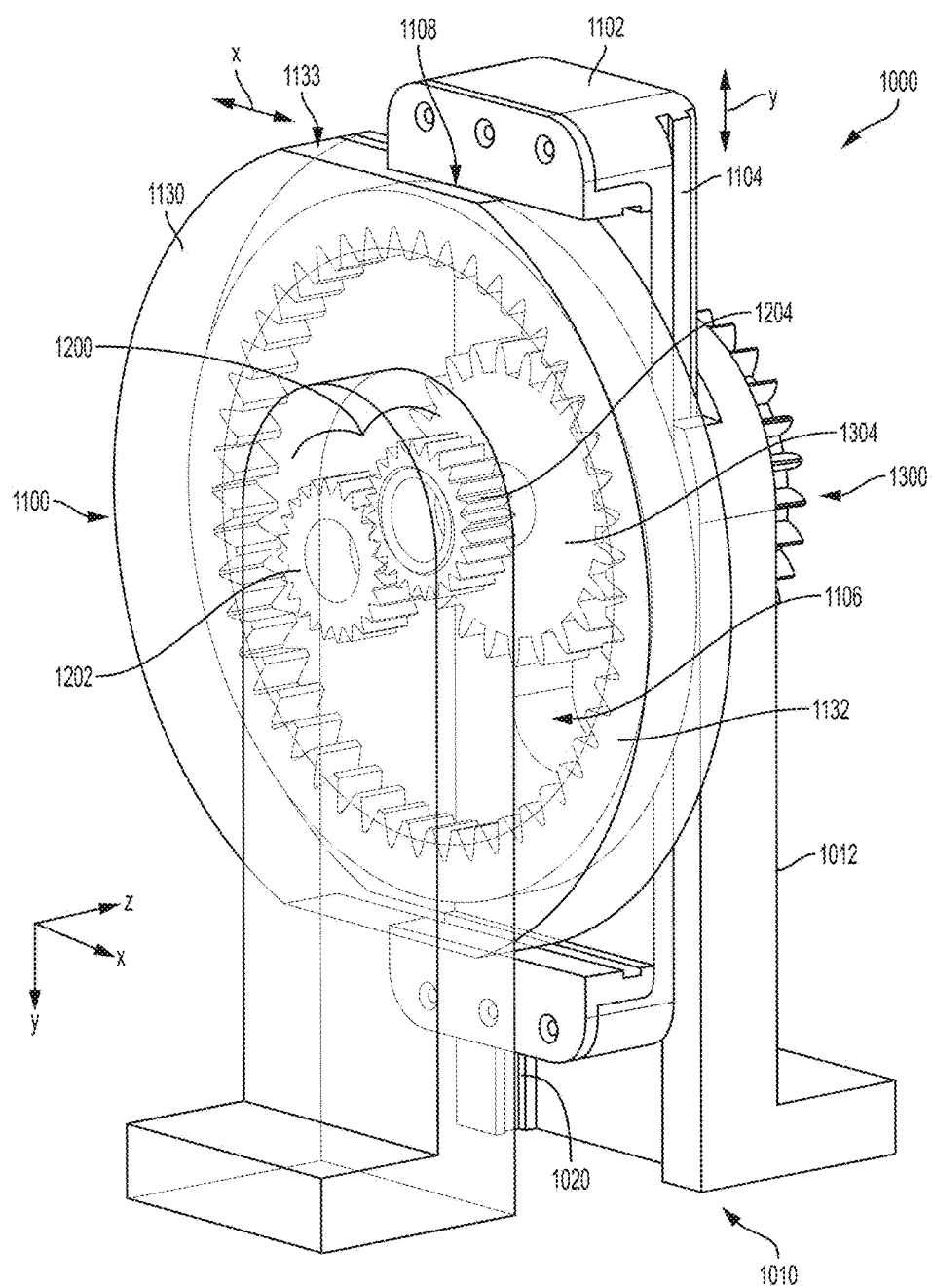
FIG. 24 is a perspective view of an example drive mechanism for converting reciprocating motion into a rotation of an output shaft, illustrating an idler assembly.
Figure 25:
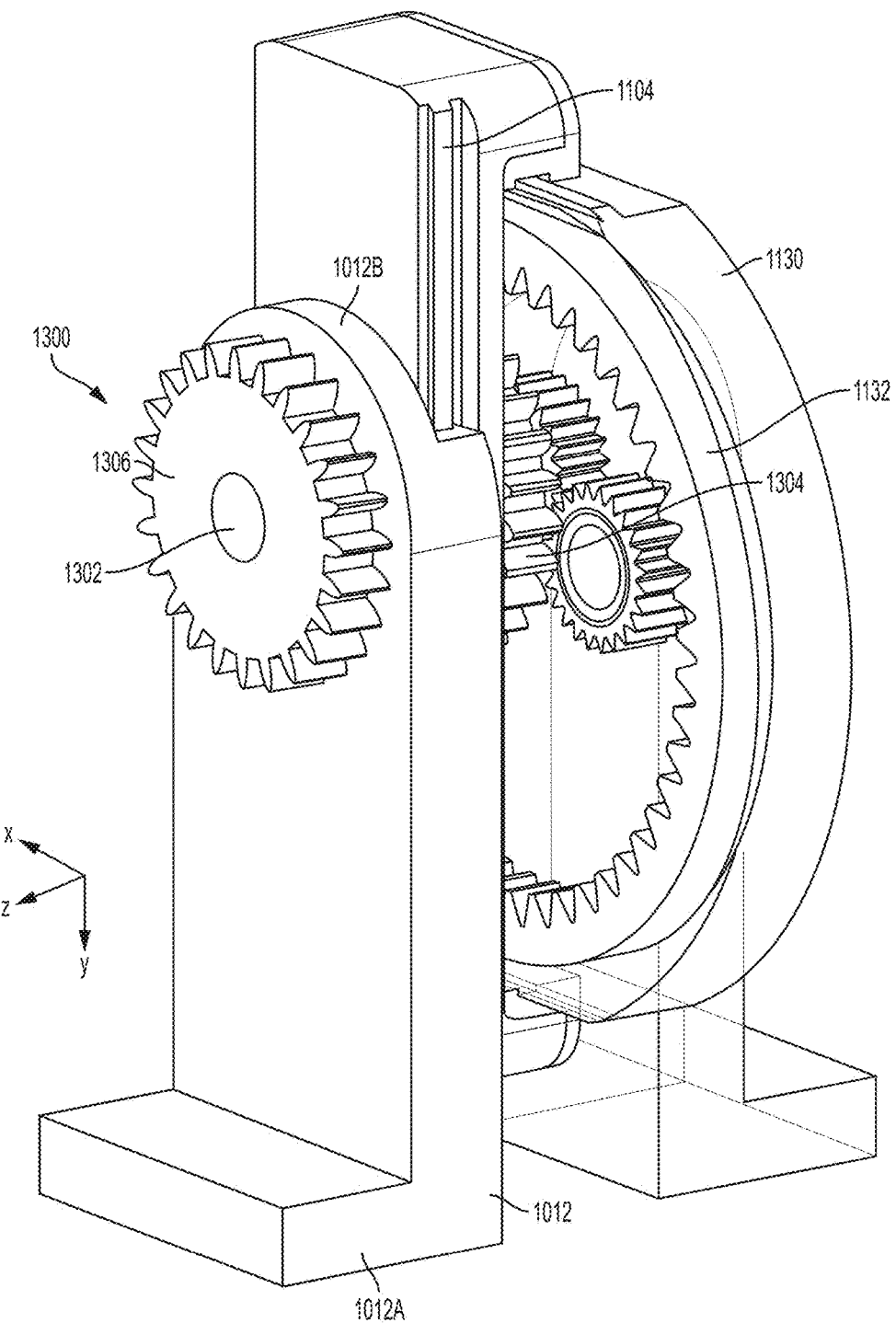
FIG. 25 is another perspective view of the example drive mechanism, illustrating the output shaft.
Figure 26C:
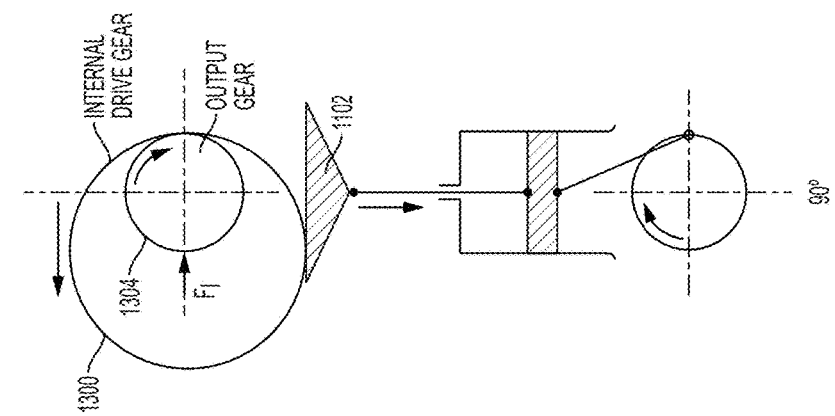
FIG. 26A-26I are sequential side view schematics of an example drive mechanism oscillating throughout a power stroke of a reciprocating piston.
Figure 26B:
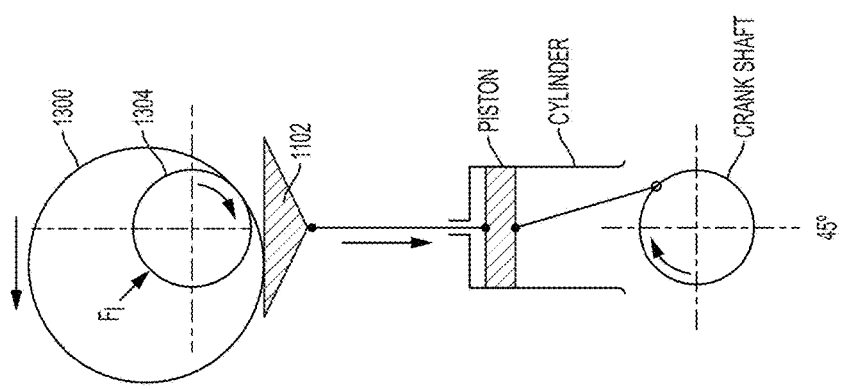
Figure 26A:
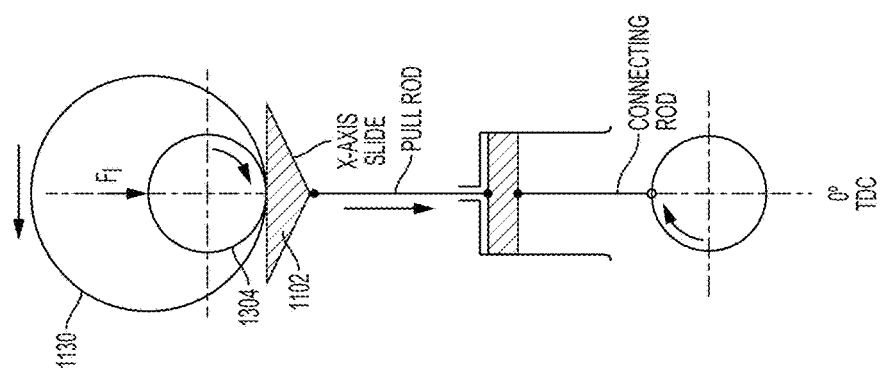
Figure 26F:
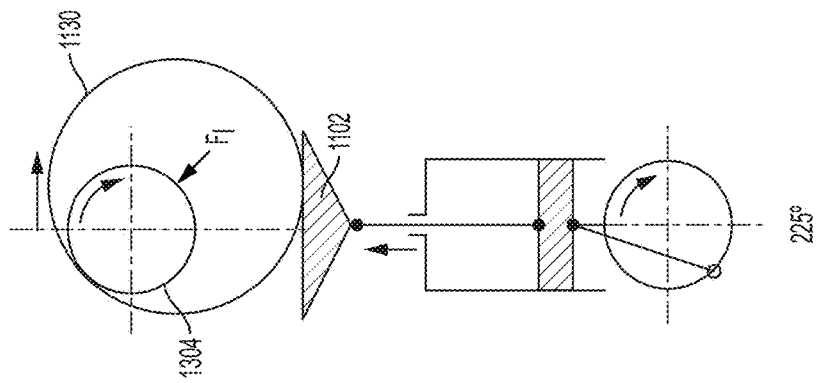
Figure 26E:
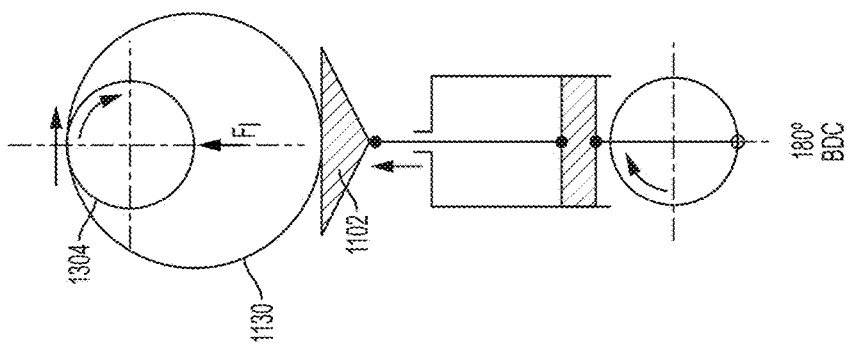
Figure 26D:
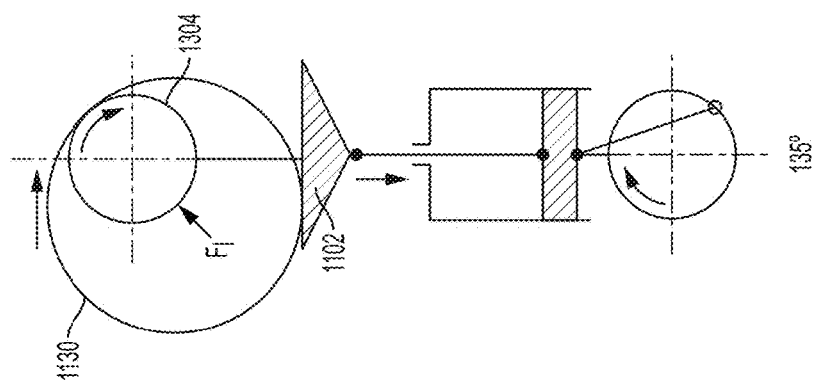
Figure 26I:
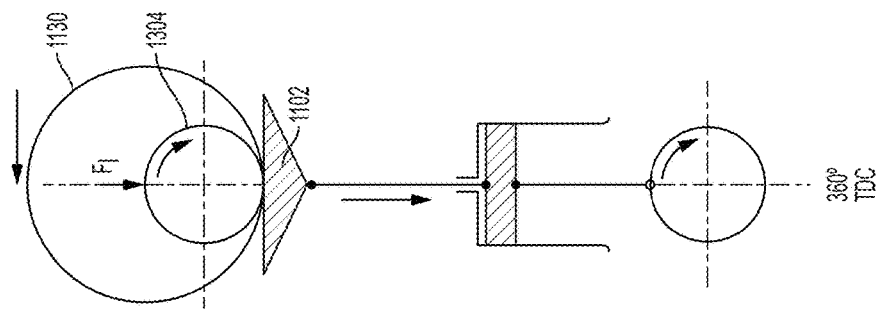
Figure 26H:
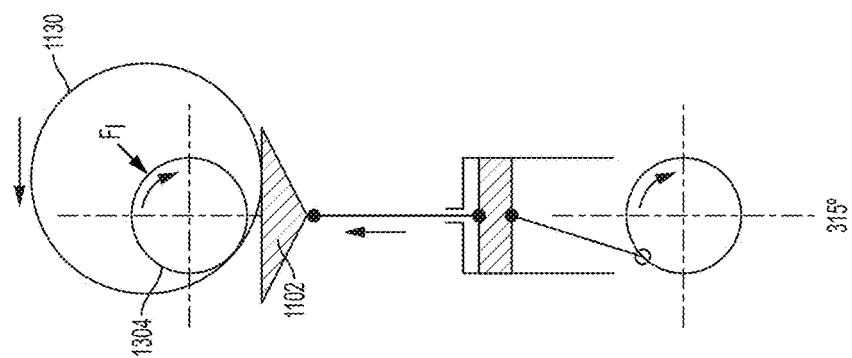
Figure 26G:
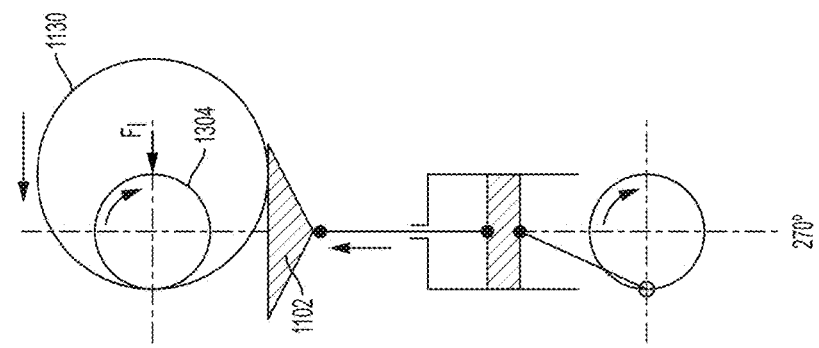

For example, referring to FIGS. 24 and 25, a drive mechanism 1000 can include a base 1010, an oscillating assembly 1100 coupled to the base 1010 and configured to interface with a reciprocating element (e.g., a piston), and a rotating output shaft assembly 1300 that engages with the oscillating assembly 1100 to provide a rotational power output, for example, to a drive shaft.

The base 1010 can serve as a mounting and positioning surface for other components of the drive mechanism, such as the oscillating assembly 1100 and output shaft assembly 1300. In some cases, the base can be an integral portion of an engine, such as part or region of an engine block or head, or can be a separate component attached to the engine. The base 1010 can include a first base plate 1012 through which the output shaft assembly 1300 (i.e., an output shaft 1302) can pass and rotate. The first base plate 1012 can define a hole or recess that serves as a bearing surface along which the output shaft 1302 can rotate. In some embodiments, the first base plate 1012 can be in the form of a multi-piece assembly, for example, formed of a journal portion 1012A and a cap portion 1012B which can be fastened to one another. In some cases, bearings can be used between the base plate 1012 and the shaft 1302. For clarity, portions of the base has been illustrated as transparent in FIGS. 24 and 25.

At least one of the portions of the base, for example, the first base plate 1012, can include an interface surface along which the one or more components of the oscillating assembly can interface. For example, the first base plate 1012 can define a sliding engagement surface 1020 along which the oscillating assembly 1100 can move. As discussed below, the engagement surface 1020 can couple a component of the oscillating assembly so that the component can freely translate axially (along the y-axis) generally in direction that the reciprocating piston translates but is generally coupled with respect to an x-axis direction. The y-axis is typically the direction of piston reciprocation (or motion of other reciprocating input) and the x-axis is substantially perpendicular the y-axis and the reciprocation.

The oscillating assembly 1100 can include an axial translating y-axis component (e.g., frame) 1102 and an x-axis component 1130 that is configured to interface with, and move along the x-axis relative to, the frame 1102, as well as engaging a portion of the output shaft assembly 1300. For clarity, the x-axis component in FIGS. 24 and 25 has been illustrated as transparent. The frame 1102 can be configured to provide a y-axis movement that allows the oscillating assembly to move along with the reciprocating motion of an engine's piston. Thus, the frame 1102 can include one or more sliding surfaces 1104 that couple the frame 1102 along the x-axis but permit the frame 1102 to translate along the y-axis with the motion of the piston. In some cases, the sliding surfaces 1104 can be configured to mate and interface with sliding surfaces 1020 of the base (e.g., of the first base plate 1012). Additionally, the sliding surfaces 1104 and 1020 can individually or together limit the frame 1102 from sliding or otherwise moving along a z-axis direction.

Figure 29:
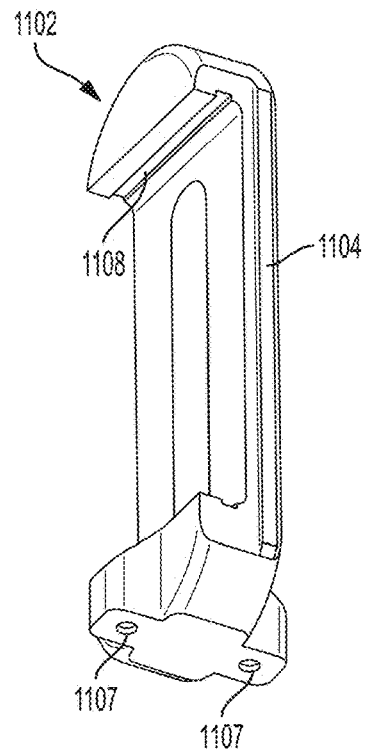
FIG. 29 is a perspective view of an example translating y-axis component illustrating sliding surfaces and attachment points for connecting to a reciprocating piston.

The frame 1102 can also include an opening (e.g., a hole) 1106 through which the output shaft 1302 can be disposed. The opening 1106 can provide clearance for the shaft 1302 as the frame oscillates in the y-axis direction with the motion of the reciprocating piston. The frame 1102 can be coupled to a reciprocating piston in any of various ways. For example, referring briefly to FIG. 29, a frame can include one or more attachment points (e.g., threaded holes) 1107 in which a tension member can connect to drive the frame. In some embodiments, as depicted, a frame can have two attachment points 1107 balanced on two sides of the frame 1102. As a result of the balanced attachment points, force applied by the reciprocating piston can be evenly applied to the frame.

The frame 1102 can be made of any of various structurally suitable materials. For example, the frame 1102 can be made of a light weight, high strength material, for example, aluminum (e.g., alloys; 4032, 7055, 6061, 7068, 5052, 2024, 2618), titanium (e.g., alloy; Ti-6242), steel (e.g., ASM alloys; 6516, 6414, 6419, 6512, 6425, 6532, 5844), magnesium (e.g., ASM alloys; 4429, 4425). The x-axis component 1130 can be made of any of various structurally suitable materials. For example, the x-axis component 1130 can be made of a light weight, high strength material, for example, aluminum (e.g., alloys; 4032, 7055, 6061, 7068, 5052, 2024, 2618), titanium (e.g., alloy; Ti-6242), steel (e.g., ASM alloys; 6516, 6414, 6419, 6512, 6425, 6532, 5844), magnesium (e.g., ASM alloys; 4429, 4425).

Figure 30:
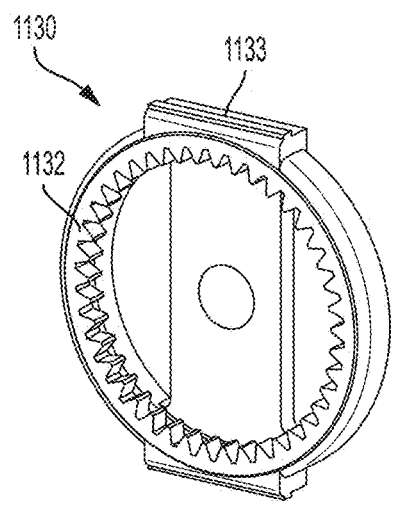
FIG. 30 is a perspective view of an example x-axis component illustrating sliding surfaces to oscillate relative to the translating y-axis component.

The x-axis component 1130 (also illustrated in FIG. 30) of the oscillating assembly 1100 is configured to move with the frame 1102 as the frame moves along the y-axis. That is, with respect to the direction of the motion of the piston, the x-axis component 1130 is coupled to the frame 1102. However, the x-axis component 1130 can be configured to move with respect to the frame 1102 along the x-axis generally perpendicular to the piston motion. For example, the x-axis component 1130 can include one or more sliding surface 1133 configured to mate and slidingly engage with one or more sliding surfaces 1108 of the frame 1102. The sliding surfaces 1133, 1108 which help permit the x-axis component 1130 to move with respect to the frame 1102 can be substantially perpendicular to the sliding surfaces 1104, 1020 that permit the frame 1102 to move with respect to the base 1010. In some embodiments, the sliding surfaces 1104, 1020 that permit the frame 1102 to move with respect to the base 1010 can be disposed substantially along the y-axis (generally in-line with the motion of the piston) which can be substantially perpendicular to the sliding surfaces 1133, 1108 which help permit the x-axis component 1130 to move with respect to the frame 1102, which can be disposed along the x-axis. Due to the complementary sliding surfaces that help to permit the x-axis component 1130 to move in both the y-direction (axially) and the x-direction (laterally), the x-axis component 1130 can orbit (e.g., move along a substantially circular path), for example, about the output shaft 1302. Additionally, the sliding surfaces 1133 and 1108 can individually or together limit the x-axis component 1130 from sliding or otherwise moving along a z-axis direction.

The sliding surfaces can be designed and implemented in any of various forms. For example, the sliding surfaces can define smooth and/or surfaces. The sliding surfaces can also define features that help to limit relative motion between components other than in the desired directions. That is, in some cases, the sliding surfaces may permit relative motion in the x and y directions, but limit relative motion along a z-axis (e.g., the z direction) to help keep the drive mechanism assembled and together during use. For example, complementary sliding surfaces can include a protrusion (e.g., flange) on one component and a recess (e.g., a groove) configured to receive the flange along the other component. In some cases, the flange and grooves can disposed in the x or y direction and limit relative motion in the z direction. In some embodiments, the sliding surfaces can include removable and/or replaceable surfaces such as ball bearing or rolling bearing slides (e.g., commercial linear bearing surfaces, such as Schneeberger type M/V). As appreciated by one skilled in the art, lubricating all sliding surfaces and surfaces of bearing and gearing contact, including metal to metal surfaces, is important in order to facilitate smooth, low friction movement, and to prevent damaging, sticking, galling, and vibration. This includes forced lubrication (e.g., oiling) of all sliding surfaces by a pumped lubricant, or a sealed system lubrication by sealing the lubricant (e.g., grease) into the sliding contact area of the moving components, or by applied non-stick surface coatings such as Teflon.

The circular motion imparted on the x-axis component 1130 by the reciprocation of the piston can be used to impart a circular (e.g., rotational) motion on the output shaft 1302. As a result, the drive mechanism 1000 converts purely axial movement (e.g., along the y-direction, in-line with the piston motion) into a movement having an x-direction component and a y-direction component to propel the output shaft with a continuous tangential force. That is, as the x-axis component 1130 travels around the output shaft, the force driving the output shaft can be consistently applied tangentially, regardless of the position of the piston between top dead center and bottom dead center. For example, the x-axis component 1130 can include an outer engaging device (e.g., an annular power transfer internal ring gear) 1132 that is configured to interface with a mating device of the rotating output shaft assembly 1300, such as a rotating pinion gear 1304 coupled to the output shaft 1302. As a result of the consistent circular motion of the x-axis component 1130 around the pinion gear 1304, the x-axis component 1130 applies a torque force to the pinion gear at a consistent moment arm length as it travels in various directions in the x-axis and y-axis.

The outer engaging device 1132 is typically coupled (e.g., fixed) with respect to the x-axis component 1130. The outer engaging device 1132 can be coupled to the x-axis component 1130 in any of various ways including a press-fit or heat-shrink connection, using fasteners, adhesives, or mechanical joining (e.g., welding). In some cases, the outer engaging device 1132 and the x-axis component 1130 can be manufactured as an integral component having features (e.g., gear teeth of interfacing grooves) machined or cast or otherwise formed directly into the x-axis component 1130.

The pinion gear 1304 and outer engaging device 1132 can be sized and configured based on aspects of the engine with which the drive mechanism is used. For example, the diameter of the outer engaging device 1132 (e.g., the pitch diameter in the case of an internal ring gear), can be two times the stroke length of the engine. Forming the outer engagement device to be double the stroke length can permit the oscillating assembly 1100 travel along the y-axis the same distance as the piston travels during a stroke. The diameter (e.g., pitch diameter) of the pinion gear 1304 is typically approximately equal to the piston stroke length of the engine. As a result, the oscillations of the drive mechanism can be in closer harmony with the reciprocation of the pistons. The diameters of the pinion gear 1304 and the internal ring gear 1132 thus configured allow for one complete 360 degree orbit of the x-axis component around the pinion gear 1304 as the pinion gear moves through one complete revolution, from top-dead-center to bottom-dead-center and back.

The drive mechanism 1000 can also include an idler (e.g., engagement) assembly 1200 that can provide a force to order to keep the outer engaging device 1132 in consistent contact with the pinion gear 1304. For example, the idler assembly 1200 can apply a force so that gear teeth of the outer engaging device 1132 are firmly meshed with gear teeth of the pinion gear 1304 throughout the full stroke of the piston. In some embodiments, the idler assembly 1200 can be offset in a z-direction relative to the driving outer engaging device 1132 and the driven pinion gear 1304 and can include an orbital engagement component (e.g., a positioning element (e.g., a post, roller, pulley wheel, sprocket, or gear)) 1202 coupled to, or integrally formed within, the x-axis component 1130. That is, the idler assembly 1200 can be on an opposite side of the x-axis component 1130 than the outer engaging device 1132. The positioning element 1202 can interface with an engagement component (e.g., a stationary engagement component (e.g., complementary feature (e.g., a post, roller, pulley wheel, belt, sprocket, chain, gear, or feature in which the orbital engagement component can engage, such as a groove or recess)) 1204 coupled to the base 1010. The positioning element 1202 is typically positioned substantially centrally (e.g., concentrically) within the center of the outer engaging device 1132. The complementary feature 1204 can be aligned (e.g., coaxially, concentrically) with the pinion gear 1304. By aligning the positioning element 1202 with the outer engaging device 1132 and the complementary feature 1204 with the pinion gear 1304, the outer engaging device 1132 can move smoothly about and continuously engage the pinion gear 1304 causing the output shaft 1302 to rotate continuously as the frame 1102 reciprocates in the y direction and the x-axis component 1130 reciprocates in the x direction providing movement and torque from the reciprocating device to the output shaft. As a result, the drive mechanism 1000 can be more balanced than some other drive devices, for example, those where an output shaft is not aligned with piston translation.

As illustrated, in some cases, the positioning element 1202 can be disposed on a side of the x-axis component 1130 that is opposite the output shaft 1302. The positioning element 1202 can be rotationally fixed to the x-axis component 1130, such as a fixed gear, and the complementary feature 1204 can be a rotatable gear attached from the base. However, in some cases, the positioning element 1202 can be configured to rotate and the complementary feature 1204 can be stationary. In some cases, both the positioning element 1202 and the complementary feature 1204 can be configured to rotate. In some embodiments, as illustrated, the idler assembly can be configured and positioned such that an interfacing contact point between the positioning element 1202 and the complementary feature 1204 is opposite an interfacing contact point between the engaging device 1132 and the pinion gear 1304 with respect to a rotational axis of the output shaft 1302. The sizes of the respective positioning element 1202 and complementary feature 1204 can vary. In the case of rollers or gears, the combined diameters (e.g., pitch diameters) of the positioning element 1202 and complementary feature 1204 are typically equal to the diameter of the pinion gear 1304. This sizing can help provide consistent contact force to keep the pinion gear 1304 in contact with the engaging device 1132. In some embodiments, the pitch diameters of the various gears can be configured in a relationship to one another such that a continuous tangential drive can be accomplished. For example, the pinion gear 1304 pitch diameter is substantially equal to the piston stroke, the engagement device (e.g., internal ring gear) 1132 is substantially equal to two times the pitch diameter of the pinion gear 1304, and the sum of the widths (e.g., pitch diameters) of the components of the idler assembly (positioning element 1202 (as a pinion gear) and the complimentary feature 1204 (as a pinion gear)) is substantially equal to the pitch diameter of the pinion gear 1304.

As illustrated in sequential simplified schematic views depicted in FIGS. 26A-26I, as the reciprocating motion of the piston drives the x-axis component 1130 along the circular path via the set of complementary sliding surfaces, the engaging device (e.g., in the form of an annular gear) 1132 rotates the pinion gear 1304 and the output shaft 1302. As one skilled in the art would appreciate, FIGS. 26A-26I have been simplified to represent schematically the interactions between the various components of the drive mechanism. The motion of the x-axis component and y-axis component is substantially (e.g., purely) sinusoidal in both the x-direction and the y-direction so that the peak axes velocities typically happen at their respective midpoints of travel and the minimum axes velocities (i.e., of zero) typically happen at the extremes of their respective travel. The interface between the positioning element 1202 and the complementary feature 1204 helps to keep the engaging device 1132 in contact with the pinion gear 1304. Since Figured 26A-26I are simplified to schematic views (i.e., the physical idler assembly components are ommited for clarity), a force caused by the interface between the positioning element 1202 and the complementary feature 1204 is represented in FIGS. 26A-26I by idler force $F_1$. Additionally, the engaging device 1132 orbits with the x-axis component 1130. The circular path of the x-axis component 1130 around the pinion gear 1304 helps to apply a force to the pinion gear 1304 that maintains a consistent moment arm throughout the reciprocation of the piston. In some aspects, the engaging device 1132, pinion gear 1304, and positioning element 1202/complementary feature 1204 can be thought of as a set of planetary gears where the positioning element 1202 is a sun gear, the pinion gear 1304 is a planetary pinion, and the engaging device 1132 is a fixed outer ring gear. However, rather than the planetary gears and ring gear rotating about the sun gear, in this case, the rotating pinion gear 1304 remains central while the positioning element 1202 and the engaging device 1132 move around the pinion gear to impart a rotational output.

It is expected that the drive mechanisms described herein can be used to capture more power from an internal combustion engine and convert more linear force from a reciprocating piston into rotational torque than with conventional crank shaft systems. For example force and torque relationships of drive mechanism 1000 in comparison to the force and torque relationships of a conventional crankshaft reciprocating mechanism are depicted in FIGS. 34, 35, 36, and 37 and discussed below.

Figure 34:
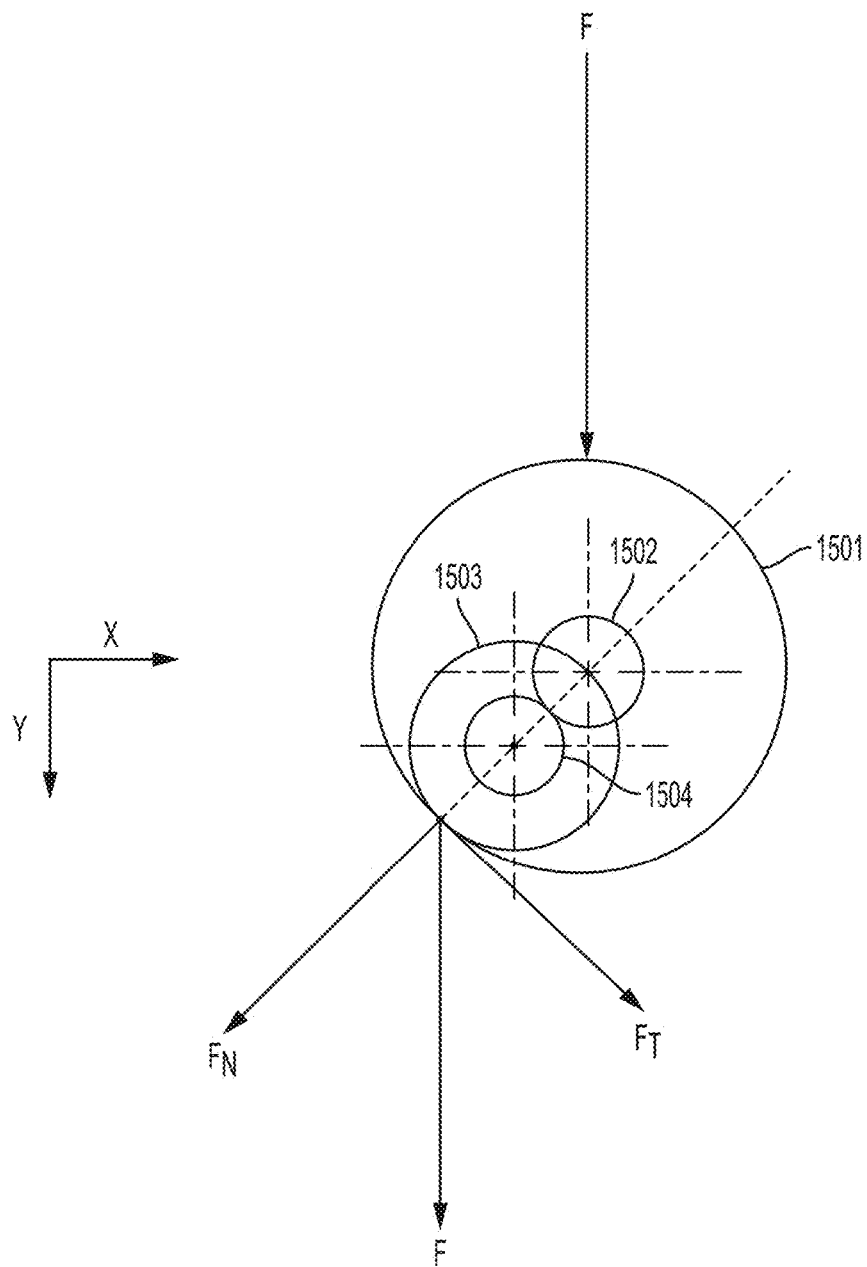
FIG. 34 is a diagram of example force component vectors interacting with pitch diameters of gears within the drive mechanism.

FIG. 34 shows a relationship between the force vectors on the gears of example mechanism 1000 as represented by the pitch diameters of the various gears (e.g., pitch diameter 1501 of the engagement device (internal ring gear) 1132, pitch diameter 1503 of pinion gear 1304, pitch diameter 1502 of the positioning element 1202, and pitch diameter 1504 of the complimentary feature 1204.) In the example drive mechanism 1000, pitch diameters 1501 and 1502 are substantially fixed in relationship with one another so that a movement in one will correspond to a movement in the other and a force applied to one will be a force applied to the other (e.g., internal ring gear 1132 and positioning element 1202 move as a unit). Additionally, in the example drive mechanism 1000, pitch diameters 1503 and 1504 are stationary in the x-y coordinates and do not translate. The pinion gear 1304 associated with the pitch diameter 1503 is allowed to rotate. As shown, vertical force F (i.e., which can be the force from a reciprocating piston) is applied to pitch diameters 1501 and 1502, and this force is simultaneously divided into two component forces, the normal force component $F_N$ and the tangent component $F_T$. The normal force vector $F_N$ is perpendicular to the tangent force vector $F_T$, and is typically directed through all of the four gear axes. At the top dead center position (TDC) of the gearing, the normal force $F_N$ is equal to the total vertical force F with no tangent force $F_T$ component. At the exact TDC position the vertical force typically does not induce rotational movement and movement through this condition is carried through by the momentum of the rotating gearing and all that is coupled to the gearing (e.g., drive trains, generators, pumps, etc.). This condition at the exact TDC position is substantially the same condition experienced by the conventional crankshaft connecting rod mechanism. Forces on and through the gears of the drive mechanism 1000 and acting on various parts of those gears (e.g., gear faces) are large and continuously varying. This puts a very high requirement for material strength on all of the gears of mechanism 1000. Materials for the gearing can be any high strength material and in some cases include materials that have been surface harden. Example materials may include any of a number of materials including case hardening steels such as; DIN-EN MnCr Steel (e.g., 20MnCr5, 20MoCr4, 20CrMo5), DIN-EN NiCrMo Steel (e.g., 20NiCrMo6-4, 18CrNiMo7-6, 14NiCrMo13-4, 17NiCrMo6-5).

Figure 36:
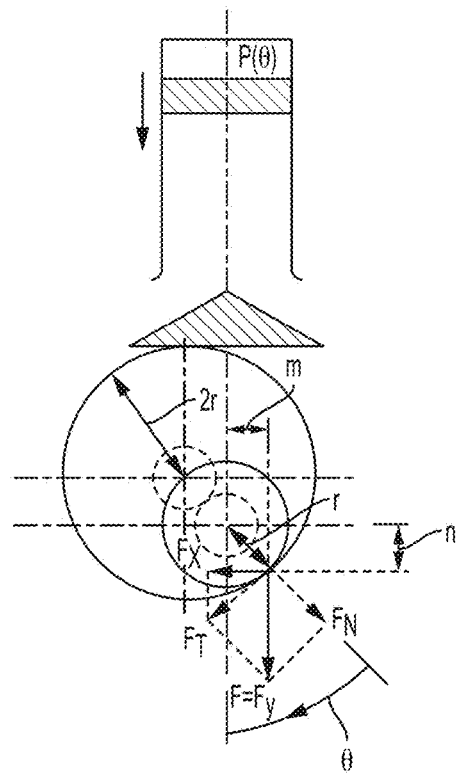
FIG. 36 is a diagram of example force component vectors and example related torque calculations of the torque applied to the output shaft by the drive mechanism described herein.

FIG. 36 further breaks the force components into x and y components and shows a mathematical relationship for torque as a function x and y forces and angular distance from the top of a mechanism stroke. As depicted in FIG. 36, the vertical force F can be represented as $F=F_y=P(\theta) \cdot A$, where $P(\theta)$ is the cylinder pressure as a function of angle from TDC and A is the piston area; $m=r \cdot \sin \theta$, where r is the radius of the pinion gear 1304 (or one half the pitch diameter 1503) and represents the length of the torque arm; $n=r \cdot \cos \theta$; $F_T=F_y \cdot \sin \theta$; $F_X=F_T \cdot \cos \theta$; and $F_X=F_y \cdot \sin \theta \cdot \cos \theta$. As a result, the overall torque, T, applied to the output shaft as a result of the two component forces can be represented as follows: $T=F_X \cdot n+F_y \cdot m=F_y \cdot \sin \theta \cdot \cos \theta \cdot r \cdot \cos \theta + F_y \cdot r \cdot \sin \theta$. These expressions can be simplified to: $T=P(\theta) \cdot A \cdot r \cdot \sin \theta \cdot \cos^2 \theta + P(\theta) \cdot A \cdot r \cdot \sin \theta$.

Figure 35:
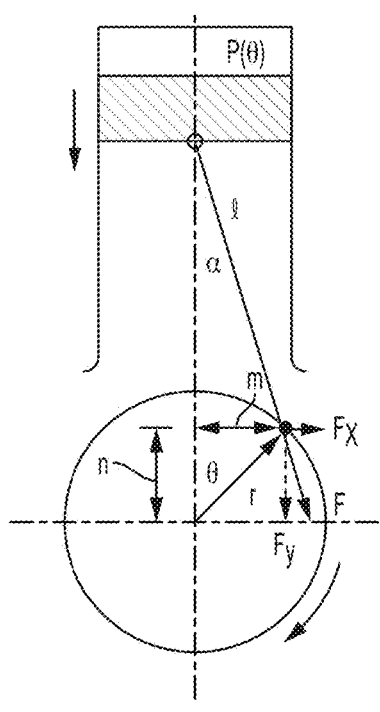
FIG. 35 is a diagram of example force vectors and torque calculation of a conventional crankshaft connecting rod reciprocating mechanism.

FIG. 35 shows a mathematical relationship for torque as a function of x and y forces and angular distance from the top of a stroke for a conventional crankshaft reciprocating mechanism. As depicted in FIG. 35, the vertical force F can be represented as $F=F_y=P(\theta) \cdot A$, where $P(\theta)$ is the cylinder pressure as a function of angle from TDC and A is the piston area; $\sin \alpha=m/l$, where $\alpha$ is an angle of the connecting rod and l is the length of the connecting rod; $m=r \cdot \sin \theta$, where r is the radius of the crankshaft; $n=\cos \theta$; $\alpha=\sin^{-1}((r \cdot \sin \theta)/l)$; $F_X=F \cdot \sin \alpha$; and $F_y=F \cdot \cos \alpha$. As a result, the overall torque, T, applied to the crankshaft can be represented as follows: $T=F_X \cdot n+F_y \cdot m=F \cdot \sin \alpha \cdot r \cdot \cos \theta+F \cdot \cos \alpha \cdot r \cdot \sin \theta$. The torque T thus equals $T=F \cdot r (\sin \alpha \cdot \cos \theta)+F \cdot r (\cos \alpha \cdot \sin \theta)$. Simplying the expression, $T=P(\theta) \cdot A \cdot r \cdot (\sin \alpha \cdot \cos \theta)+P(\theta) \cdot A \cdot r \cdot (\cos \alpha \cdot \sin \theta)$.

Figure 37:
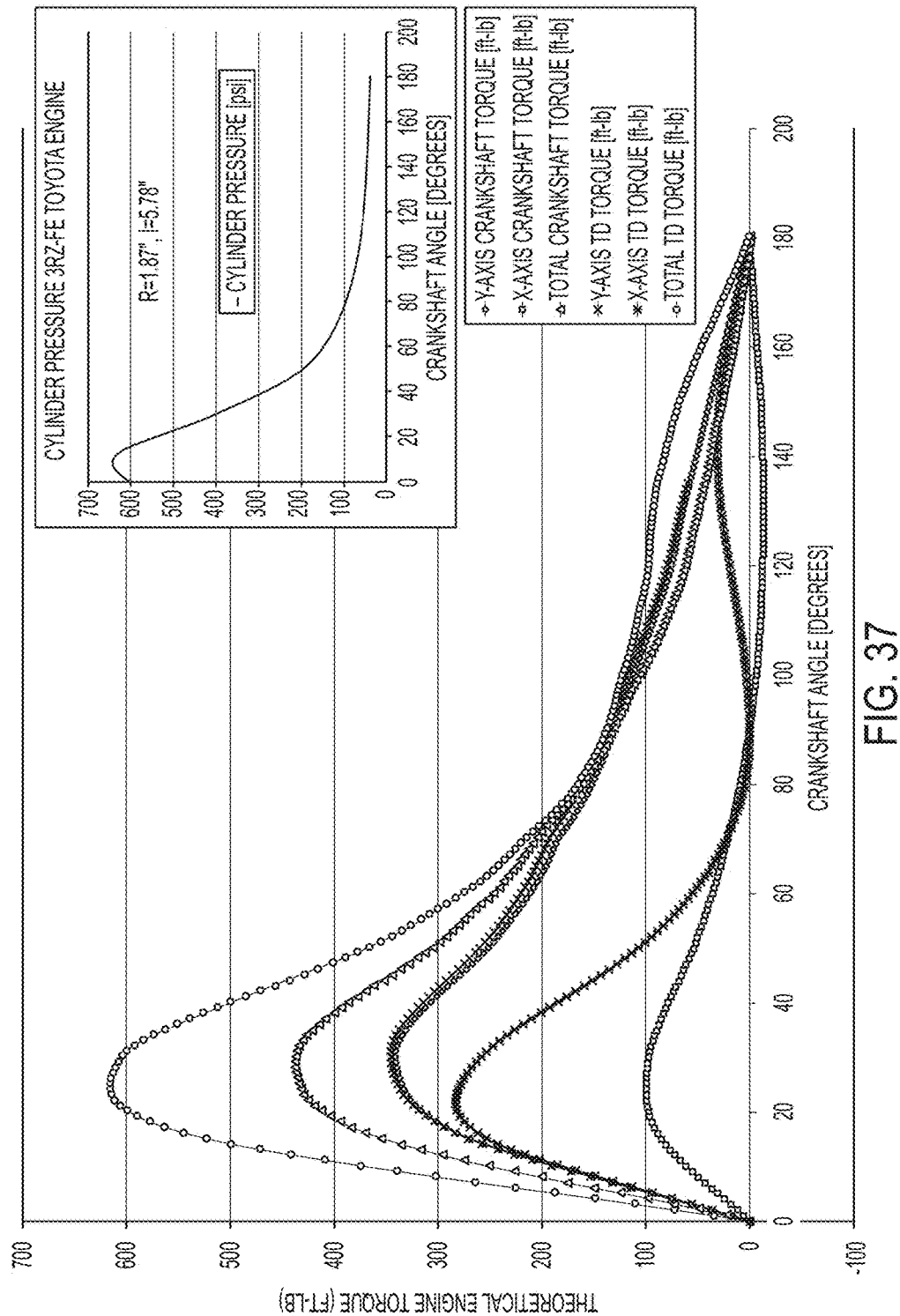
FIG. 37 is a comparison plot of calculated torque output of an example tangent drive mechanism, such as those described herein, as compared to a conventional crankshaft connecting rod reciprocating mechanism for the same input pressure (or force) function.

FIG. 37 is a plot of a calculation of example torques calculated for the tangent drive mechanism 1000 applied to an internal combustion engine, whose torque is depicted in FIG. 36, as compared to the example torque of a conventional crankshaft connecting rod mechanism applied to an internal combustion engine, whose torque is depicted in FIG. 35, both using the same pressure (force) as a function of angle, the same torque arm length, r=1.87", and for the case of the conventional crankshaft connecting rod engine a typical value for connecting rod length is used, l=5.78". Torque values are plotted for both x and y components and totals and plotted over the same 180 degrees of a power stroke. As can be seen in FIG. 37, the drive mechanism 1000 instantaneous torque is consistently greater than that of the crankshaft mechanism and the overall average torque for the drive mechanism 1000 is about 33% higher than that of the conventional crankshaft connecting rod mechanism. Also, apparent in FIG. 37 is the negative impact of the x-axis movement (e.g., away from and towards the central longitudinal axis of the piston) of the connecting rod of the crankshaft mechanism, where it has a negative impact on torque after 90 degrees. This effect of varying x-axis position is not present in the drive mechanism 1000.

Referring back to FIGS. 24-33, the output shaft 1302 can be connected to one or more additional drive train components depending on the desired implementation or field of use of the drive mechanism. As shown, in some embodiments, an output gear 1306 can be coupled to the output shaft 1302.

Figure 27:
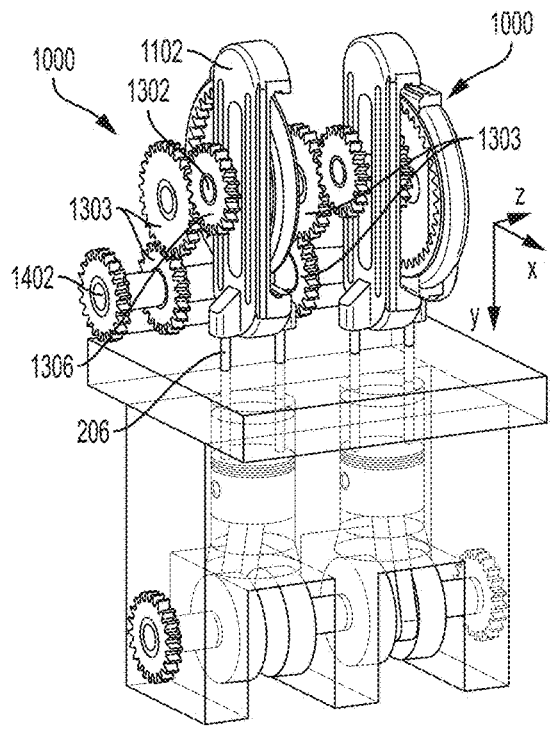
FIG. 27 is a perspective view of example drive mechanisms coupled to reciprocating pistons of an engine through their respecitve combustion chambers, illustrating each of the drive mechanisms coupled to a combined drive shaft.
Figure 28:
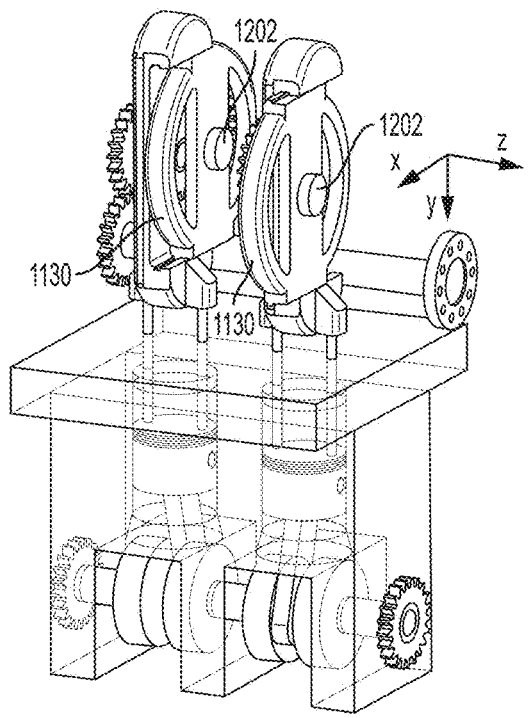
FIG. 28 is another perspective view of the example drive mechanisms and engine of FIG. 27 illustrating idler assembly portions of respective x-axis components.

As discussed herein, the drive mechanisms that convert reciprocating axial motion into a substantially continuous radial motion can be used in a variety of different applications. For example, the drive mechanism 1000 can be implemented and used in a similar manner as the power delivery device 400 to interface with an internal combustion engine. In some embodiments, tension devices (e.g., pull rods) can axially couple the frame 1102 to the reciprocating piston in a similar manner as the pull rods 206 discussed above. An example implementation is depicted in FIGS. 27 and 28. For clarity, the example shown in FIGS. 27 and 28 is illustrated with the base 1010, onto which the complementary feature 1204 is typically mounted, removed to provide an unobstructed view of the drive mechanisms. However, the base could be manufactured into separate components that attach to the engine or into the structure that couples the drive mechanisms 1000 to the engine block.

As shown in FIGS. 27 and 28, multiple drive mechanisms 1000 can be used together where the respective output shafts 1302 are mechanically coupled to a combined drive shaft 1402. Any of various devices can be used to drive the combined drive shaft 1402 with the individual output shafts 1302, such as belts and pulleys, chains and sprockets, gears, etc. The examples illustrated include a gear set 1303 to connect the drive mechanisms (e.g., the output gear) 1306 to the combined drive shaft 1402. As discussed above, while power can be extracted from the engine using the drive mechanisms 1000 and combined drive shaft 1402, the engine can include a crankshaft and connecting rods, which can serve to facilitate reciprocating of the pistons and return the pistons to top dead center.

Figure 31:
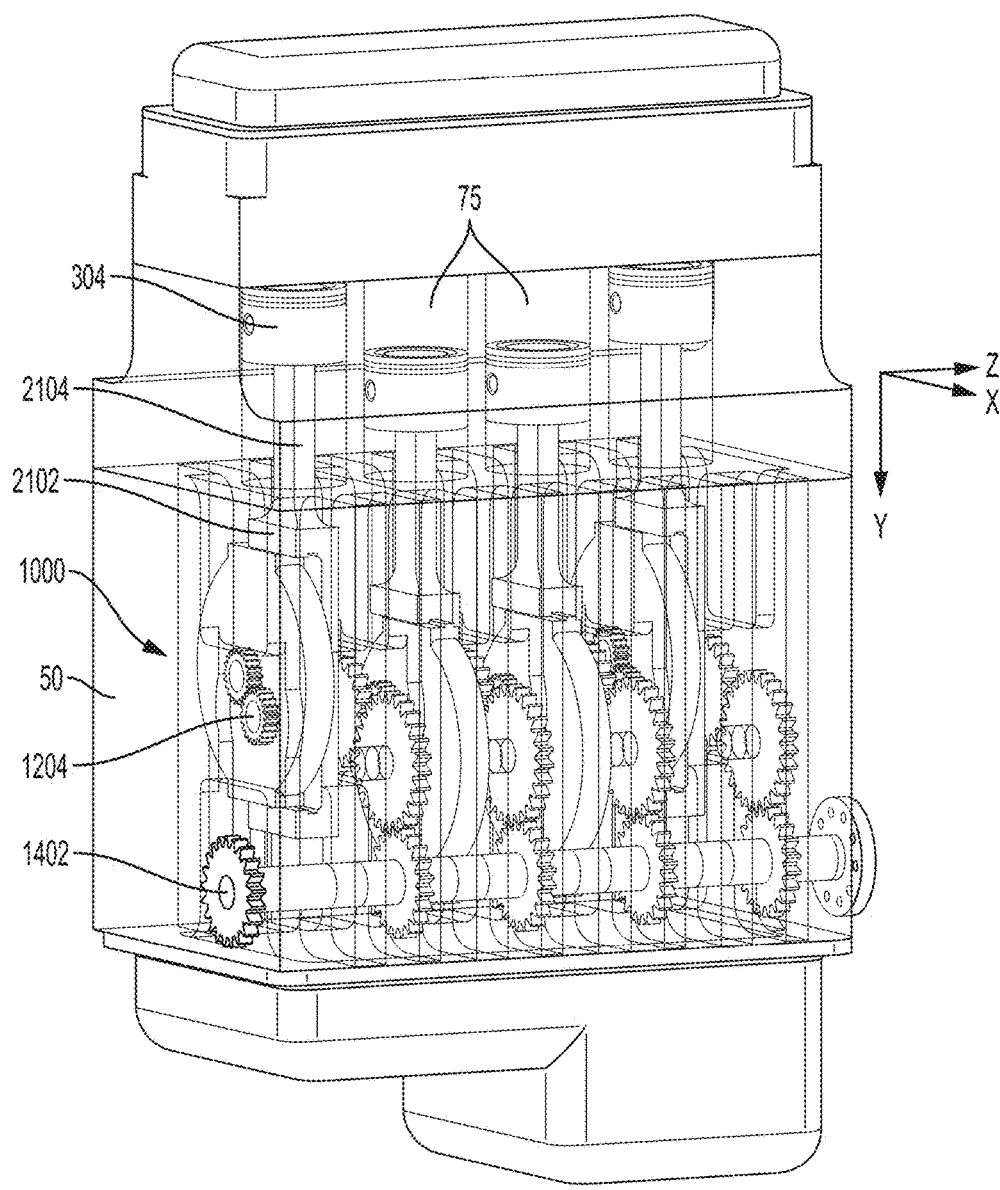
FIG. 31 is a perspective view of an example internal combustion engine using example drive mechanisms in place of a conventional crankshaft mechanism.
Figure 32:
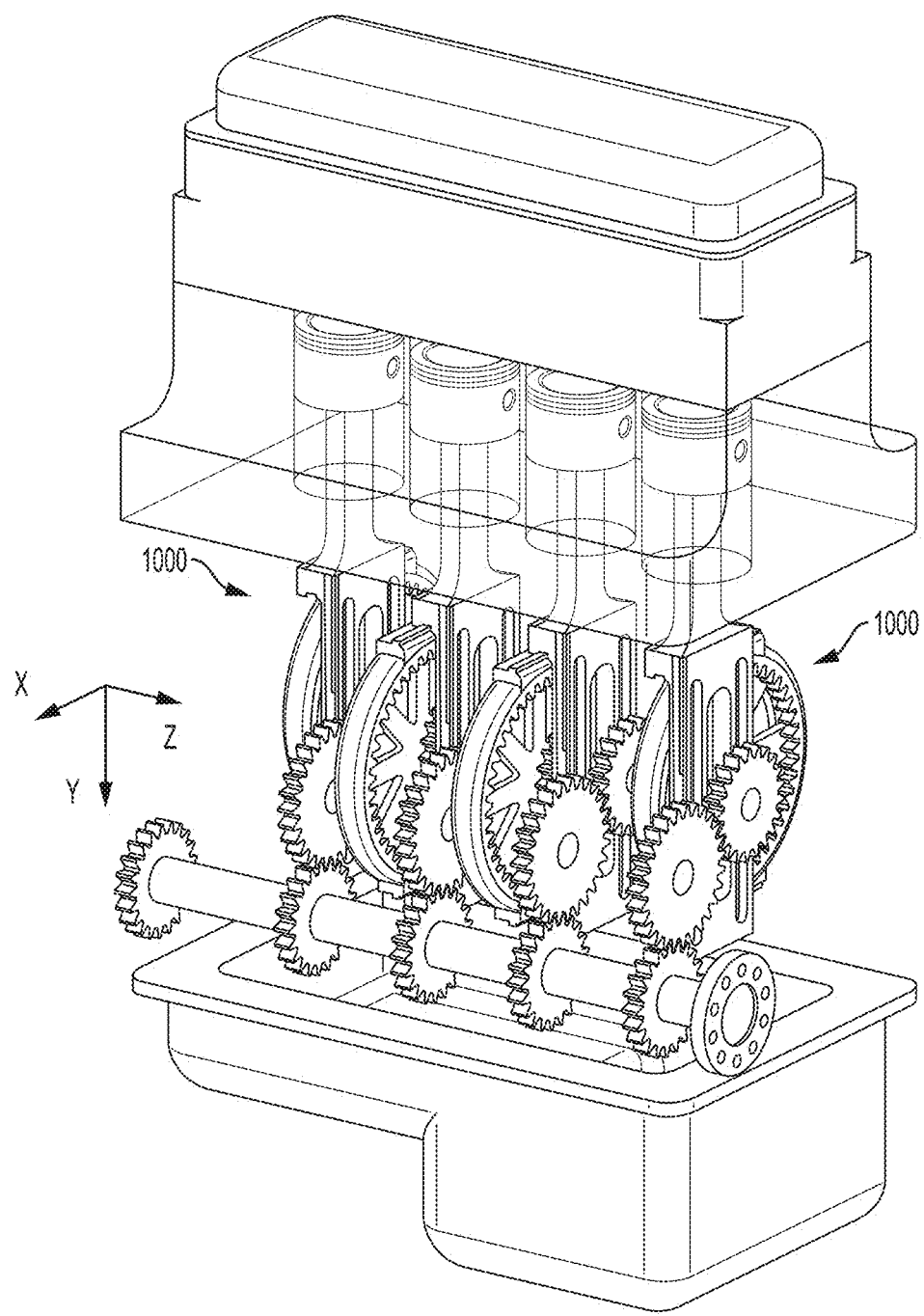
FIG. 32 is another perspective view of the example engine of FIG. 31 with the engine block removed for clarity, illustrating connections between the drive mechanism and a drive shaft.

Drive mechanisms, such as those described above as drive mechanism 1000, can additionally or alternatively be implemented to replace conventional crankshaft and connecting rod systems to delivery internal combustion engine power to a rotating drive shaft. As illustrated in FIGS. 31 and 32, rather than connecting to a piston using a pull rod device disposed through a combustion chamber, the drive mechanism 1000 can be disposed within an engine block 50 between a piston and a drive shaft 1402. For example, a frame 2102 can be coupled directly to a piston 304 within the block 50 of an engine opposite the combustion chamber 75 in place of a conventional connecting rod. As illustrated, the frame 2102 can be designed and structured similar to a connecting rod having a beam-like neck portion 2104 that connects to the piston, for example, using a wrist pin or similar connection.

In some embodiments, the block 50 can serve as the base to which the drive mechanism 1000 can be connected (e.g., fastened, coupled). Specifically, the complementary feature 1204 can be mounted in the engine block 50, for example, in a manner similar to which crankshafts are mounted in conventional engines, for example, using journals and bearings. For clarity, the example in FIG. 31 has been illustrated with a transparent engine block 50 and FIG. 32 has been illustrated without the engine block 50 to clearly show the drive mechanisms 1000.

Since the drive mechanisms 1000 are disposed within the engine block 50 in these embodiments, other top end components of the engine, such as the, air intake, heads, valving, fuel injection, and ignition (e.g., spark plugs or compression ignition) could remain similar or essentially the same as used in other conventional internal combustion engines.

Figure 33:
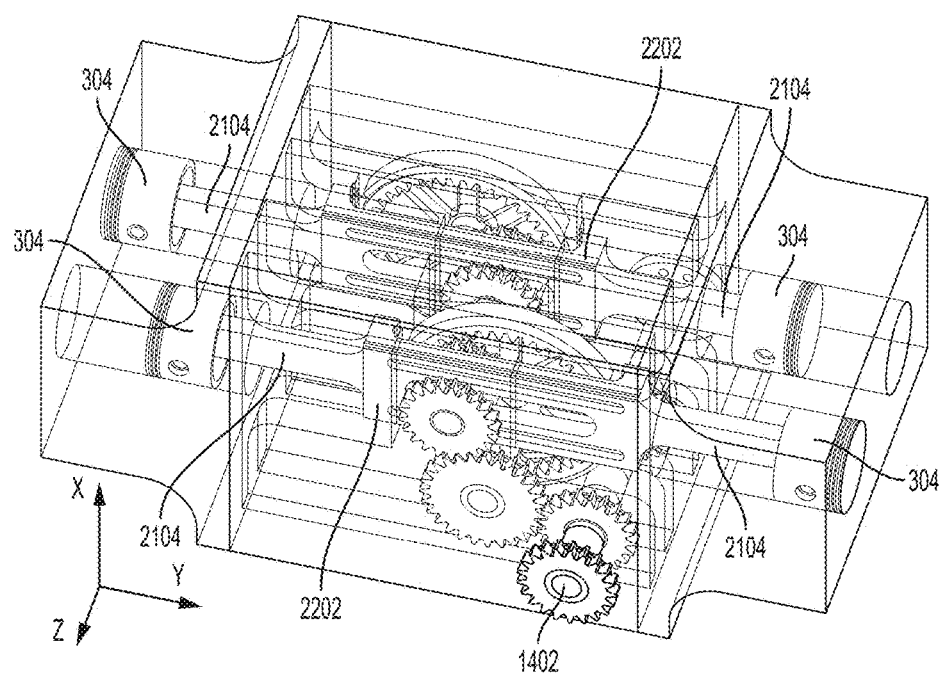
FIG. 33 is a perspective view of an example internal combustion engine having drive mechanisms in place of a conventional crankshaft, where each drive mechanism is coupled to two opposing reciprocating pistons.

Other implementations of the drive mechanism are possible. In some embodiments, a modified internal combustion engine can include drive mechanisms that are each coupled to two opposing pistons that reciprocate with one another. For example, referring to FIG. 33, an engine can include one or more drive mechanisms that include a frame 2202 that is directly connected to two pistons 304, wherein the path of motion of the pistons and the frame is generally in-line with one another. For clarity, the engine block in FIG. 33 is shown as transparent. The frame 2202 can include two opposing beam-like neck portions 2104 at opposing ends that connect to the pistons, for example, using wrist pins or similar connections. The alternating reciprocation of two pistons 304 connected to the frame 2202 can result in consistent, alternating motion of the frame 2202 to provide consistent motion of the x-axis component 1130 around the pinion gear 1304 helps to apply a force to the pinion gear 1304 that maintains a consistent moment arm throughout the reciprocation of the piston. This type of engine with opposing pistons can sometimes be referred to as a flat engine, boxer engine, or a horizontally opposed engine. In this opposed piston configuration only one frame 2202 is required for two pistons so that the overall parts count of the engine can be reduced.

In some embodiments, the power delivery device having a substantially steady or constant moment arm to generate increased torque and power can be included as part of an engine modification kit (e.g., engine retrofit kit) that can be installed onto an engine for use. For example, in some embodiments, the pistons and connecting rods and top end components of an engine (e.g., the cylinder head and valve train, ignition system, fuel supply system, etc.) can remain in place and the lower end (e.g., the engine block (or portion thereof) and crankshaft assembly) be replaced in order to install the separate power delivery device and power output shaft onto an existing engine system. Such a modification kit could be used as a method for increasing the output torque and power of an existing engine.

While the power delivery devices have generally been described as having a consistent (e.g., constant or invariant) length torque moment arm which has a consistent (e.g., constant or invariant) length that is at its maximum, non-changing length throughout the power stroke, some variation in moment arm length is possible. For example, in some embodiments, the power delivery device (e.g., the rotating member or the interfacing portion of the pull rod) is configured so that the moment arm acting on the output shaft is not perfectly constant at its maximum value. In some cases, the moment arm length varies slightly as the tension device translates and interfaces with the rotatable member. For example, the moment arm can vary slightly as the gear rack interfaces with a rotating pinion gear or as a chain interfaces with a rotating sprocket.

A typical maximum moment arm length for conventional reciprocating engines would be the crankshaft radius or half the engine stroke; however, this may vary for various engine designs. Because conventional reciprocating engines typically have a torque moment arm length that varies from 0 length (at crankshaft angles of 0 degrees and 180 degrees ATDC) to its maximum length (at a crankshaft angle of 90 degrees ATDC), any moment arm length that varies less than this range (i.e., 0 to maximum) is expected to be an improvement for torque generation. For example, in some cases, the consistent length moment arm devices described herein can vary from about 0% to about 50% change in length (e.g., about 0% to about 40%, about 0% to about 30%, about 0% to about 20%, about 0% to about 15%, about 0% to about 10%, about 0% to about 5%, about 0% to about 2%, about 0% to about 1%, about 0% to about 0.5%, about 0% to about 0.1%, about 0% to about 0.0001%) as the pull rod reciprocates with the pistons and an improvement would be realized and noticed.

It is noted that these descriptions and geometric relationships are generally described herein for a substantially vertically aligned cylinder arranged above the centerline (e.g., axis) of the crankshaft. However, the principles described herein can also be implemented using differently configured reciprocating engines. That is, the equations presented herein that are used to describe the differences between extracting power from a crankshaft and extracting power from a separate power delivery device (e.g., drivetrain) having a constant length moment arm can be adjusted or updated based on a particular engine configuration, but the increased output of the constant moment arm engine is expected to be observed with the differently configured engines.

Additionally, while the examples herein generally relate to implementations of the drive mechanisms in which they are used to harness linear motion and convert it to rotational motion of an output shaft, other examples are possible. For example, in some cases, drive mechanisms, such as those described above as drive mechanism 1000, can additionally or alternatively be implemented to replace conventional crankshaft and connecting rod systems of reciprocating pumps and compressors. As one skilled in the art would appreciate, in such cases, the basic components of the drive mechanism 1000 could be used but convert the rotational input of a rotating shaft into a reciprocating motion of a piston assembly. Therefore, the output assembly described above (e.g., the output shaft assembly 1300) would instead serve as an input shaft assembly. Similarly, the output pinion gear 1304 would serve as an input pinion gear. In such cases, an increase in torque transfer from a driving pinion gear 1304 to a driven piston assembly through mechanism 1000 would tend to increase overall mechanical efficiency.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A reciprocating engine comprising:
an engine block defining at least one cylinder;
at least one piston assembly reciprocating within the at least one cylinder; and
a drive mechanism for generating a rotational output from a reciprocating input of the piston assembly, the drive mechanism comprising:
an axially translating y-axis component configured to reciprocate along a y-axis with the reciprocating input of the piston assembly relative to a base to which the y-axis component is slidingly attached;
an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear;
an output shaft assembly rotatingly coupled to a base and having an output gear that interfaces with the internal ring gear; and
a stationary engagement component substantially concentrically disposed relative to the output shaft assembly, the stationary engagement component interfacing with the orbital engagement component of the x-axis component, the interfacing between the stationary engagement component and the orbital engagement component of the x-axis component maintaining contact between the internal ring gear and the output gear as the internal ring gear orbits about and drives the output gear.

2. The engine of claim 1 wherein the reciprocating engine comprises an opposed piston multiple cylinder engine, wherein the axially translating y-axis component is coupled to two opposing pistons.

3. The engine of claim 1 wherein the stationary engagement component comprises a rotatable element.

4. The engine of claim 1 wherein the stationary engagement component comprises a recess with which the orbital engagement component interfaces.

5. The engine of claim 1 wherein the orbital engagement component comprises a gear or roller.

6. The engine of claim 1 wherein a pitch diameter of the output gear is substantially equal to a stroke length of the reciprocating engine and a pitch diameter of the internal ring gear is substantially equal to two times the stroke length of the reciprocating engine and the sum of respective pitch diameters of the orbital engagement component and the stationary engagement component is substantially equal to a stroke length of the reciprocating engine.

7. The engine of claim 1 wherein the output shaft assembly comprises a torque transfer gear which transfers torque from the output shaft assembly to the drive gear of the engine drive shaft assembly.

8. The engine of claim 7 wherein the torque transfer gear comprises a sprocket and chain assembly.

9. The engine of claim 1 wherein the base comprises a portion of the engine block.

10. The engine of claim 1 wherein the y-axis component comprises a linear bearing surface along which the y-axis component slides relative to the base with the reciprocating input.

11. The engine of claim 10 wherein the linear bearing surface substantially limits the y-axis component from moving relative to the base except for in the direction of the reciprocating input.

12. The engine of claim 1 wherein the x-axis component comprises a linear bearing surface along which the x-axis component slides substantially perpendicularly to the direction of the reciprocating input.

13. A drive mechanism for generating a rotational output from a reciprocating input of a piston assembly of a reciprocating engine, the drive mechanism comprising:
an axially translating y-axis component configured to reciprocate along a y-axis with the reciprocating input of the piston assembly relative to a base to which the y-axis component is attached;
an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear;
an output shaft assembly rotatingly coupled to the base and having an output gear that interfaces with the internal ring gear; and
a stationary engagement component substantially concentrically disposed relative to the output shaft assembly, the stationary engagement component interfacing with the orbital engagement component of the x-axis component, the interfacing between the stationary engagement component and the orbital engagement component of the x-axis component maintaining tangential engagement between the internal ring gear and the output gear as the internal ring gear orbits about and drives the output gear.

14. The drive mechanism of claim 13 wherein the reciprocating engine comprises an opposed piston multiple cylinder engine, wherein the axially translating y-axis component is coupled to two opposing pistons.

15. The drive mechanism of claim 14 where the reciprocating engine comprises an internal combustion engine.

16. The drive mechanism of claim 13 wherein the reciprocating engine comprises an in-line multiple cylinder combustion engine.

17. The drive mechanism of claim 13 wherein the stationary engagement component comprises a rotatable element.

18. The drive mechanism of claim 17 wherein the rotatable element comprises a gear.

19. The drive mechanism of claim 13 wherein the stationary engagement component comprises a recess with which the orbital engagement component interfaces.

20. The drive mechanism of claim 13 wherein the orbital engagement component comprises a gear or roller.

21. The drive mechanism of claim 13 wherein the orbital engagement component comprises a shaft device.

22. The drive mechanism of claim 21 wherein the shaft device is fixedly coupled or integrally formed within the x-axis component.

23. The drive mechanism of claim 13 wherein a pitch diameter of the output gear is substantially equal to a stroke length of the reciprocating engine and a pitch diameter of the internal ring gear is substantially equal to two times the stroke length of the reciprocating engine and the sum of respective pitch diameters of the orbital engagement component and the stationary engagement component is substantially equal to a stroke length of the reciprocating engine.

24. The drive mechanism of claim 13 wherein the output shaft assembly comprises a torque transfer gear which transfers torque from the output shaft assembly to the drive shaft.

25. The drive mechanism of claim 24 wherein the torque transfer gear comprises a sprocket and chain assembly.

26. The drive mechanism of claim 13 wherein the base comprises a portion of an engine block.

27. The drive mechanism of claim 13 wherein the base comprises a component attached to an engine block.

28. The drive mechanism of claim 13 wherein the y-axis component comprises a linear bearing surface along which the y-axis component slides relative to the base with the reciprocating motion.

29. The drive mechanism of claim 28 wherein the linear bearing surface substantially limits the y-axis component from moving relative to the base except for in the direction of the reciprocating input.

30. The drive mechanism of claim 13 wherein the x-axis component comprises a linear bearing surface along which the x-axis component slides substantially perpendicularly to the direction of the reciprocating input.

31. A method of converting an axial force from a reciprocating input of a reciprocating element to a torque applied to a shaft assembly and/or converting an input torque from shaft assembly to an axial force applied to the reciprocating motion of the reciprocating element, the method comprising:
applying an axial force to move an axially translating y-axis component configured to reciprocate along a y-axis with the reciprocating motion of a piston assembly relative to a base to which the y-axis component is slidingly attached;
transmitting the axial force through an x-axis component which is slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; and
transmitting the axial force to an output shaft assembly rotatingly coupled to the base and having a gear that interfaces with the internal ring gear, wherein a stationary engagement component substantially concentrically disposed relative to the shaft assembly interfaces with the orbital engagement component of the x-axis component, the interfacing between the stationary engagement component and the orbital engagement component of the x-axis component maintaining engagement between the internal ring gear and the gear as the axial force is transmitted from the internal ring gear to the gear.

32. The method of claim 31 wherein the stationary engagement component comprises a rotatable element.

33. The method of claim 31 wherein the orbital engagement component comprises a gear or roller.

34. The method of claim 31 wherein the y-axis component comprises a linear bearing surface along which the y-axis component slides relative to the base with the reciprocating motion.

35. The method of claim 31 wherein the x-axis component comprises a linear bearing surface along which the x-axis component slides substantially perpendicularly to the direction of the reciprocating motion.

36. A method of converting a reciprocating axial force from a reciprocating motion of a reciprocating element into a torque applied to a shaft and/or converting a torque applied to the shaft into the reciprocating motion of the reciprocating element, the method comprising:
applying the axial force to slide an axial translating component with the reciprocating motion of the reciprocating element relative to the shaft, wherein the axial translating component is axially coupled to an internal ring gear engaged with the shaft and the internal ring gear is configured to slide relative to the axial translating component in a direction substantially perpendicular to the reciprocating motion of the reciprocating element;
maintaining contact between the internal ring gear and the shaft using an idler assembly substantially concentrically disposed relative to the internal ring gear; and
as the axial translating component and internal ring gear coupled thereto slide axially relative to the shaft, permitting the internal ring gear to slide in the direction substantially perpendicular to the reciprocating motion of the reciprocating element, thereby causing the internal ring gear to orbit about, and apply the torque to, the shaft during reciprocation of the reciprocating element.

37. The method of claim 35 wherein permitting the internal ring gear to slide in the direction substantially perpendicular to the reciprocating motion of the reciprocating element comprises permitting the internal ring gear to move relative to the axial translating component along one or more bearing surfaces.

38. The method of claim 35 wherein the maintaining contact between the internal ring gear and the shaft using the idler assembly comprises applying a force, using a stationary engagement component coupled to, or integrally formed along, a base and substantially concentric with the shaft, to an orbital engagement component disposed substantially concentric with the internal ring gear.

39. A drive mechanism for generating a rotational output from a reciprocating motion and/or for generating a reciprocating output from a rotational motion, the drive mechanism comprising:
an axial translating y-axis component configured to reciprocate along a y-axis with the reciprocating motion relative to a base to which the y-axis component is attached;
an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear;
a shaft assembly rotatingly coupled to the base and having a gear that interfaces with the internal ring gear; and
a stationary engagement component substantially concentrically disposed relative to the shaft assembly, the stationary engagement component interfacing with the orbital engagement component of the x-axis component, the interfacing between the stationary engagement component and the orbital engagement component of the x-axis component substantially maintaining tangential engagement between the internal ring gear and the gear as the internal ring gear orbits.

40. The drive mechanism of claim 39 wherein a pitch diameter of the gear is substantially equal one unit of length and a pitch diameter of the internal ring gear is substantially equal to two times the pitch diameter of the gear and the sum of respective pitch diameters of the orbital engagement component and the stationary engagement component is substantially equal to the pitch diameter of the gear.

41. A reciprocating compressor comprising:
a cylinder block defining at least one cylinder;
at least one piston assembly reciprocating within the at least one cylinder; and
a drive mechanism for generating a reciprocating output of the piston assembly from a rotational input, the drive mechanism comprising:
an axially translating y-axis component configured to reciprocate along a y-axis with the reciprocating output of the piston assembly relative to a base to which the y-axis component is slidingly attached;
an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear;
an input shaft assembly rotatingly coupled to a base and having a pinion gear that interfaces with the internal ring gear; and
a stationary engagement component substantially concentrically disposed relative to the input shaft assembly, the stationary engagement component interfacing and tangentially engaging with the orbital engagement component of the x-axis component, the interfacing between the stationary engagement component and the orbital engagement component of the x-axis component maintaining substantial contact between the internal ring gear and the pinion gear as the internal ring gear orbits about and is driven by the pinion gear of the input shaft assembly.

42. The compressor of claim 41 wherein a pitch diameter of the pinion gear is substantially equal to a stroke length of the reciprocating compressor and a pitch diameter of the internal ring gear is substantially equal to two times the stroke length of the compressor and the sum of respective pitch diameters of the orbital engagement component and the stationary engagement component is substantially equal to a stroke length of the compressor.

43. A reciprocating pump comprising:
a cylinder block defining at least one cylinder;
at least one piston assembly reciprocating within the at least one cylinder; and
a drive mechanism for generating a reciprocating output of the piston assembly from a rotational input, the drive mechanism comprising:
an axially translating y-axis component configured to reciprocate along a y-axis with the reciprocating output of the piston assembly relative to a base to which the y-axis component is slidingly attached;
an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear;
an input shaft assembly rotatingly coupled to a base and having a pinion gear that interfaces with the internal ring gear; and
a stationary engagement component substantially concentrically disposed relative to the input shaft assembly, the stationary engagement component interfacing and tangentially engaging with the orbital engagement component of the x-axis component, the interfacing between the stationary engagement component and the orbital engagement component of the x-axis component maintaining substantial contact between the internal ring gear and the pinion gear as the internal ring gear orbits about and is driven by the pinion gear of the input shaft assembly.

44. The reciprocating compressor of claim 41 wherein the reciprocating compressor comprises an opposed piston multiple cylinder compressor and at least one axially translating y-axis component is coupled to two opposing pistons.

45. The reciprocating pump of claim 43 wherein the reciprocating pump comprises an opposed piston multiple cylinder compressor and at least one axially translating y-axis component is coupled to two opposing pistons.

\* \* \* \* \*